United States Patent
Richter et al.

(10) Patent No.: US 12,033,290 B2
(45) Date of Patent: Jul. 9, 2024

(54) METHOD AND DEVICES FOR PRESENTING AND MANIPULATING CONDITIONALLY DEPENDENT SYNTHESIZED REALITY CONTENT THREADS

(71) Applicant: Apple Inc., Cupertino, CA (US)

(72) Inventors: Ian M. Richter, Los Angeles, CA (US); Michael J. Rockwell, Palo Alto, CA (US); Amritpal Singh Saini, San Jose, CA (US); Olivier Soares, Oakland, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/233,867

(22) Filed: Aug. 14, 2023

(65) Prior Publication Data
US 2023/0386149 A1    Nov. 30, 2023

Related U.S. Application Data

(63) Continuation of application No. 17/557,739, filed on Dec. 21, 2021, now Pat. No. 11,769,305, which is a
(Continued)

(51) Int. Cl.
| | |
|---|---|
| *G06T 19/00* | (2011.01) |
| *G06N 3/04* | (2023.01) |
| *G06N 3/08* | (2023.01) |

(52) U.S. Cl.
CPC ............ *G06T 19/006* (2013.01); *G06N 3/04* (2013.01); *G06N 3/08* (2013.01)

(58) Field of Classification Search
None
See application file for complete search history.

(56) References Cited

U.S. PATENT DOCUMENTS

| | | |
|---|---|---|
| 2006/0122884 A1 | 6/2006 | Graham et al. |
| 2011/0098056 A1 | 4/2011 | Rhoads et al. |
| (Continued) | | |

FOREIGN PATENT DOCUMENTS

| | | |
|---|---|---|
| KR | 1020130137968 A | 12/2013 |
| KR | 1020170018930 A | 2/2017 |
| (Continued) | | |

OTHER PUBLICATIONS

International Search Report and Written Opinion dated May 22, 2019, International Application No. PCT/US2019/018303, pp. 1-11.
(Continued)

*Primary Examiner* — Robert J Craddock
(74) *Attorney, Agent, or Firm* — Fernando & Partners, LLP

(57) ABSTRACT

In one implementation, a method includes: instantiating a first objective-effectuator (OE) associated with first attributes and a second OE associated with second attributes into a synthesized reality (SR) setting, wherein the first OE is encapsulated within the second OE; providing a first objective to the first OE based on the first and second attributes; providing a second objective to the second OE based on the second attributes, wherein the first and second objectives are associated with a time period between a first and second temporal points; generating a first set of actions for the first OE based on the first objective and a second set of actions for the second OE based on the second objective; and rendering for display the SR setting for the time period including the first set of actions performed by the first OE and the second set of actions performed by the second OE.

23 Claims, 24 Drawing Sheets

Related U.S. Application Data continuation of application No. 16/965,139, filed as application No. PCT/US2019/018303 on Feb. 15, 2019, now Pat. No. 11,238,661.

(60) Provisional application No. 62/679,201, filed on Jun. 1, 2018, provisional application No. 62/632,378, filed on Feb. 19, 2018.

(56) References Cited

U.S. PATENT DOCUMENTS

| | | |
|---|---|---|
| 2013/0176334 A1 | 7/2013 | Boldyrev et al. |
| 2013/0259238 A1 | 10/2013 | Xiang et al. |
| 2013/0289998 A1 | 10/2013 | Eller et al. |
| 2014/0104394 A1 | 4/2014 | Yanai et al. |
| 2014/0120887 A1 | 5/2014 | Huang |
| 2014/0285519 A1 | 9/2014 | Uusitalo et al. |
| 2015/0375103 A1 | 12/2015 | George |
| 2016/0131761 A1 | 5/2016 | Yates et al. |
| 2017/0124626 A1 | 5/2017 | Barnett et al. |
| 2017/0216675 A1 | 8/2017 | Goslin et al. |
| 2019/0279425 A1 | 9/2019 | Yin |

FOREIGN PATENT DOCUMENTS

| | | |
|---|---|---|
| WO | 2017096096 A1 | 6/2017 |
| WO | 2018/005596 A1 | 1/2018 |

OTHER PUBLICATIONS

Robin Baumgarten et al., "Combining AI Methods for Learning Bots in a Real-Time Strategy Game", International Journal of Computer Games Technology, vol. 2009, Article ID 129075, pp. 1-10.

PCT International Search Report and Written Opinion dated Sep. 13, 2019, International Application No. PCT/US2019/034142, pp. 1-11.

Chinese First Office Action dated Feb. 3, 2023, Chinese Application No. 2019800117247, pp. 1-11 (Including English Translation of Search Report).

Notice of Allowance for corresponding KR Application No. 10-2020-7023241 dated Feb. 15, 2023.

METHOD AND DEVICES FOR PRESENTING AND MANIPULATING CONDITIONALLY DEPENDENT SYNTHESIZED REALITY CONTENT THREADS

TECHNICAL FIELD

The present disclosure generally relates to objective-effectuators (OEs) within synthesized reality (SR) settings and, more specifically, to presenting and manipulating OEs within conditionally dependent SR content threads.

BACKGROUND

Some devices are capable of generating and presenting synthesized reality settings. Some synthesized reality settings include virtual settings that are simulated replacements of physical settings. Some synthesized reality settings include augmented settings that are modified versions of physical settings. Some devices that present synthesized reality settings include mobile communication devices such as smartphones, head-mountable displays (HMDs), eye-glasses, heads-up displays (HUDs), head-mountable enclosures, and optical projection systems. Most previously available devices that present synthesized reality setting are ineffective at presenting representations of certain objects. For example, some previously available devices that present synthesized reality settings are unsuitable for presenting representations of objects that are associated with an action.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
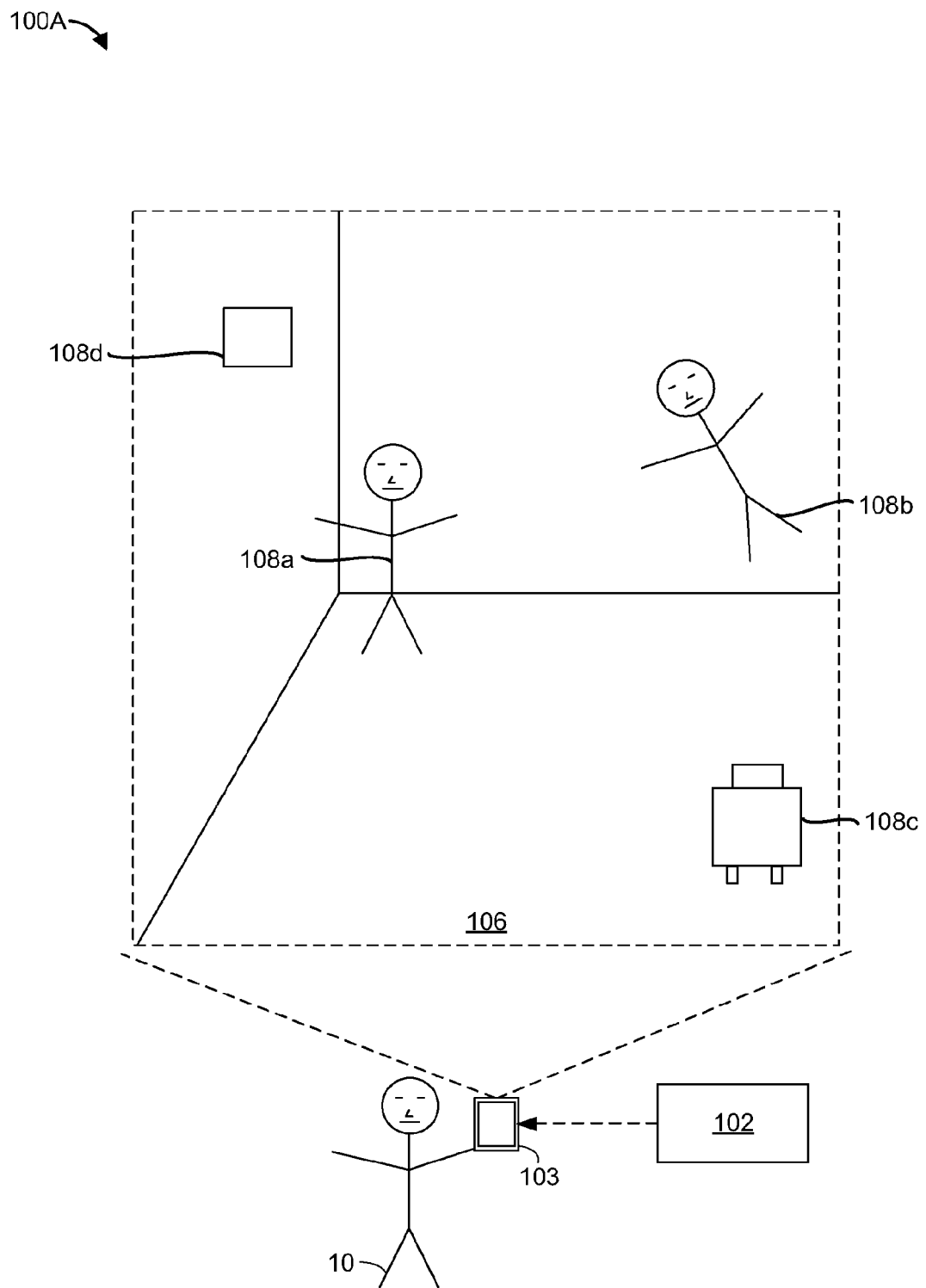
FIGS. 1A and 1B are diagrams of example operating environments in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for instantiating an OE encapsulation within an SR setting. In various implementations, a device includes a non-transitory memory and one or more processors coupled with the non-transitory memory. In some implementations, a method includes: instantiating a first objective-effectuator (OE) associated with a first set of attributes and a second OE associated with a second set of attributes into a synthesized reality (SR) setting, wherein the first OE is encapsulated within the second OE; providing a first objective to the first OE based on the first and second sets of attributes; providing a second objective to the second OE based on the second set of attributes, wherein the first and second objectives are associated with a first time period between a first temporal point and a second temporal point; generating a first set of actions associated with the first time period for the first OE based on the first objective; generating a second set of actions associated with the first time period for the second OE based on the second objective; and rendering for display the SR setting including the first set of actions performed by the first OE and the second set of actions performed by the second OE.

Various implementations disclosed herein include devices, systems, and methods for initializing and generating content for an OE encapsulation within an SR setting. In various implementations, a device includes a non-transitory memory and one or more processors coupled with the non-transitory memory. In some implementations, a method includes: synthesizing an initial set of objectives for an objective-effectuator (OE) encapsulation based on a set of actions extracted from source assets associated with an event, wherein the OE encapsulation includes a first OE encapsulated within a second OE, and wherein the initial set of objectives includes a first objective for the first OE that is consistent with a second objective for the second OE; instantiating the OE encapsulation into a virtual, wherein the OE encapsulation is characterized by the initial set of objectives and a set of visual rendering attributes; generating updated objectives for the OE encapsulation based on a function of the initial set of objectives, contextual information associated with the event, and the set of actions; and modifying the OE encapsulation based on the updated set of objectives.

Various implementations disclosed herein include devices, systems, and methods for initializing and generating content for an OE within an SR setting. In various implementations, a device includes a non-transitory memory and one or more processors coupled with the non-transitory memory. In some implementations, a method includes:

synthesizing an initial set of objectives for a first objective-effectuator (OE) based on a set of actions extracted from source assets associated with an event; instantiating the first OE into an SR setting, wherein the first OE is characterized by the initial set of objectives and a set of visual rendering attributes; generating updated objectives for the first OE based on a function of the initial set of objectives, contextual information associated with the event, and the set of actions; and modifying the first OE based on the updated set of objectives.

Various implementations disclosed herein include devices, systems, and methods for selecting a point-of-view within an SR setting (e.g., a conditionally dependent SR content threads environment). In various implementations, a device includes a non-transitory memory and one or more processors coupled with the non-transitory memory. In some implementations, a method includes: presenting a first SR view of an event that includes SR content associated with the event, wherein the SR content includes a plurality of related layers of SR content that perform actions associated with the event; detecting selection of a respective layer among the plurality of related layers of SR content associated with the event; and presenting a second SR view of the event that includes the respective layer of SR content in response to the selection of the respective layer, wherein the second SR view corresponds to a point-of-view of the respective layer.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste.

In contrast, a synthesized reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, an SR system may detect an individual walking a few paces forward and, responsive thereto, adjust graphics and audio presented to the individual in a manner similar to how such scenery and sounds would change in a physical setting. Modifications to attribute(s) of virtual object(s) in an SR setting also may be made responsive to representations of movement (e.g., audio instructions).

An individual may interact with and/or sense an SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Another example of SR is mixed reality (MR). An MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationery with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one implementation, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

The present disclosure provides methods, systems, and/or devices for presenting and manipulating SR settings. An emergent content engine generates objectives for objective-effectuators, and provides the objectives to corresponding objective-effectuator engines so that the objective-effectuator engines can generate actions that satisfy the objectives. The objectives generated by the emergent content engine indicate plots or story lines for which the objective-effectuator engines generate actions. Generating objectives enables presentation of dynamic objective-effectuators that perform actions as opposed to presenting static objective-effectuators, thereby enhancing the user experience and improving the functionality of the device presenting the SR setting.

FIG. 1A is a block diagram of an example operating environment 100A in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100A includes a controller 102 and an electronic device 103. In the example of FIG. 1A, the electronic device 103 is being held by a user 10. In some implementations, the electronic device 103 includes a smartphone, a tablet, a laptop, or the like.

As illustrated in FIG. 1A, the electronic device 103 presents a synthesized reality setting 106. In some implementations, the synthesized reality setting 106 is generated by the controller 102 and/or the electronic device 103. In some implementations, the synthesized reality setting 106 includes a virtual setting that is a simulated replacement of a physical setting. In other words, in some implementations, the synthesized reality setting 106 is simulated by the controller 102 and/or the electronic device 103. In such implementations, the synthesized reality setting 106 is different from the physical setting where the electronic device 103 is located. In some implementations, the synthesized reality setting 106 includes an augmented setting that is a modified version of a physical setting. For example, in some implementations, the controller 102 and/or the electronic device 103 modify (e.g., augment) the physical setting where the electronic device 103 is located in order to generate the synthesized reality setting 106. In some implementations, the controller 102 and/or the electronic device 103 generate the synthesized reality setting 106 by simulating a replica of the physical setting where the electronic device 103 is located. In some implementations, the controller 102 and/or the electronic device 103 generate the synthesized reality setting 106 by removing and/or adding items from the simulated replica of the physical setting where the electronic device 103 is located.

In some implementations, the synthesized reality setting 106 includes various SR representations of objective-effectuators, such as a boy action figure representation 108a, a girl action figure representation 108b, a robot representation 108c, and a drone representation 108d. In some implementations, the objective-effectuators represent characters from fictional materials, such as movies, video games, comics, and novels. For example, the boy action figure representation 108a represents a 'boy action figure' character from a fictional comic, and the girl action figure representation 108b represents a 'girl action figure' character from a fictional video game. In some implementations, the synthesized reality setting 106 includes objective-effectuators that represent characters from different fictional materials (e.g., from different movies/games/comics/novels). In various implementations, the objective-effectuators represent things (e.g., tangible objects). For example, in some implementations, the objective-effectuators represent equipment (e.g., machinery such as planes, tanks, robots, cars, etc.). In the example of FIG. 1A, the robot representation 108c represents a robot and the drone representation 108d represents a drone. In some implementations, the objective-effectuators represent things (e.g., equipment) from fictional materials. In some implementations, the objective-effectuators represent things from a physical setting, including things located inside and/or outside of the synthesized reality setting 106.

In various implementations, the objective-effectuators perform one or more actions in order to effectuate (e.g., complete/satisfy/achieve) one or more objectives. In some implementations, the objective-effectuators perform a sequence of actions. In some implementations, the controller 102 and/or the electronic device 103 determine the actions that the objective-effectuators are to perform. In some implementations, the actions of the objective-effectuators are within a degree of similarity to actions that the corresponding characters/things perform in the fictional material. In the example of FIG. 1A, the girl action figure representation 108b is performing the action of flying (e.g., because the corresponding 'girl action figure' character is capable of flying, and/or the 'girl action figure' character frequently flies in the fictional materials). In the example of FIG. 1A, the drone representation 108d is performing the action of hovering (e.g., because drones in physical settings are capable of hovering). In some implementations, the controller 102 and/or the electronic device 103 obtain the actions for the objective-effectuators. For example, in some implementations, the controller 102 and/or the electronic device 103 receive the actions for the objective-effectuators from a remote server that determines (e.g., selects) the actions.

In various implementations, an objective-effectuator performs an action in order to satisfy (e.g., complete or achieve) an objective. In some implementations, an objective-effectuator is associated with a particular objective, and the objective-effectuator performs actions that improve the likelihood of satisfying that particular objective. In some implementations, SR representations of the objective-effectuators are referred to as object representations, for example, because the SR representations of the objective-effectuators represent various objects (e.g., real objects, or fictional objects). In some implementations, an objective-effectuator representing a character is referred to as a character objective-effectuator. In some implementations, a character objective-effectuator performs actions to effectuate a character objective. In some implementations, an objective-effectuator representing an equipment is referred to as an equipment objective-effectuator. In some implementations, an equipment objective-effectuator performs actions to effectuate an equipment objective. In some implementations, an objective-effectuator representing an environment is referred to as an environmental objective-effectuator. In some implementations, an environmental objective-effectuator performs environmental actions to effectuate an environmental objective.

In some implementations, the synthesized reality setting 106 is generated based on an input from the user 10. For example, in some implementations, the electronic device 103 receives an input indicating a terrain for the synthesized reality setting 106. In such implementations, the controller 102 and/or the electronic device 103 configure the synthesized reality setting 106 such that the synthesized reality setting 106 includes the terrain indicated via the input. In some implementations, the input indicates environmental conditions for the synthesized reality setting 106. In such implementations, the controller 102 and/or the electronic device 103 configure the synthesized reality setting 106 to have the environmental conditions indicated by the input. In some implementations, the environmental conditions include one or more of temperature, humidity, pressure, visibility, ambient light level, ambient sound level, time of day (e.g., morning, afternoon, evening, or night), and precipitation (e.g., overcast, rain, or snow).

In some implementations, the actions for the objective-effectuators are determined (e.g., generated) based on an input from the user 10. For example, in some implementations, the electronic device 103 receives an input indicating placement of the SR representations of the objective-effectuators. In such implementations, the controller 102 and/or the electronic device 103 position the SR representations of the objective-effectuators in accordance with the placement indicated by the input. In some implementations, the input indicates specific actions that the objective-effectuators are permitted to perform. In such implementations, the controller 102 and/or the electronic device 103 select the actions for the objective-effectuator from the specific actions indicated by the input. In some implementations, the controller 102 and/or the electronic device 103 forgo actions that are not among the specific actions indicated by the input. In some implementations, the controller 102 and/or the electronic device 103 include at least a portion of the emergent content architectures in FIGS. 8A-8C.

Figure 1B:
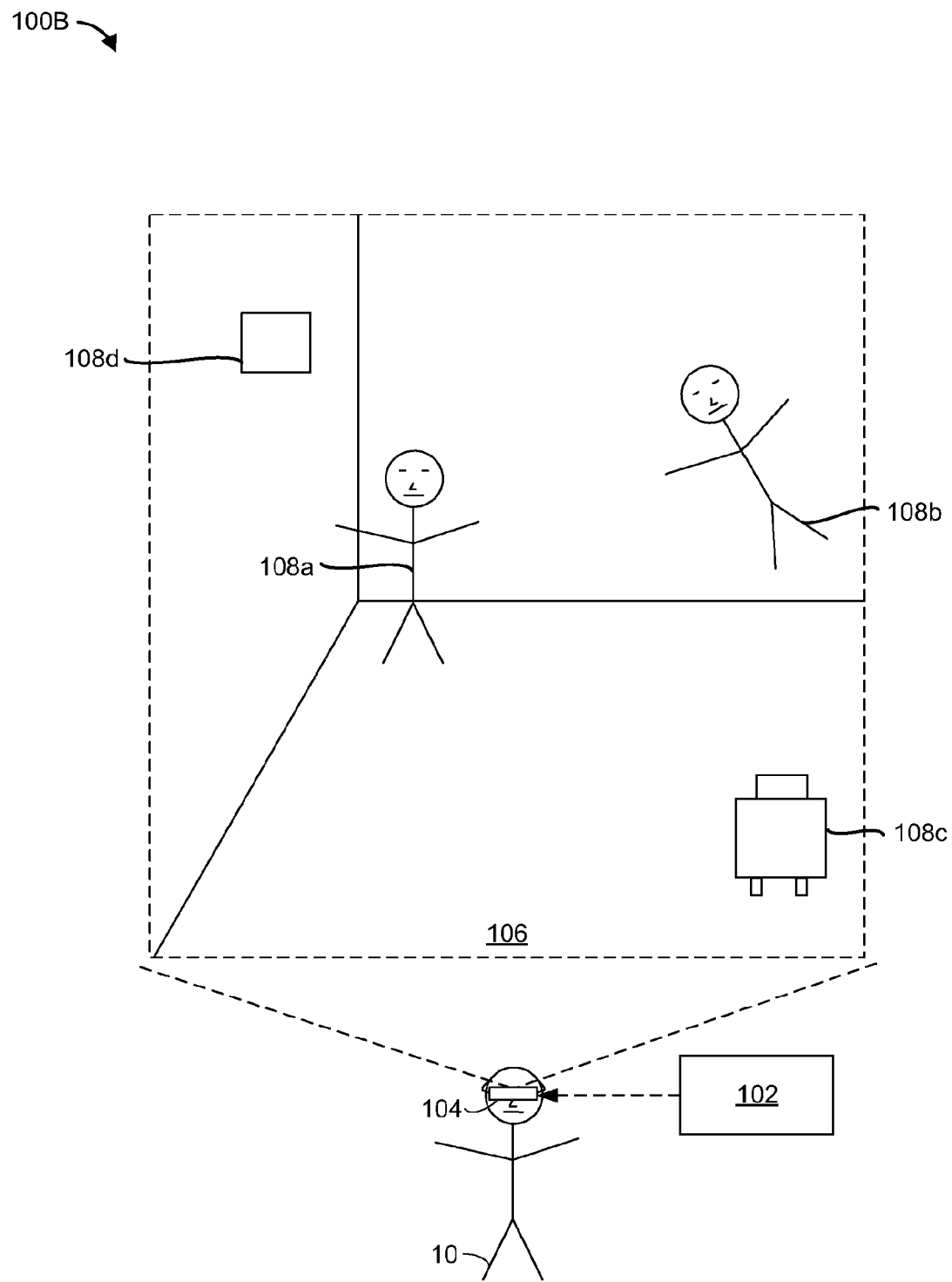

FIG. 1B is a block diagram of an example operating environment 100B in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100B includes the controller 102 and a head-mountable device (HMD) 104. In the example of FIG. 1B, the HMD 104 is worn by the user 10. In various implementations, the HMD 104 operates in substantially the same manner as the electronic device 103 shown in FIG. 1A. In some implementations, the HMD 104 performs substantially the same operations as the electronic device 103 shown in FIG. 1A. In some implementations, the HMD 104 includes a head-mountable enclosure. In some implementations, the head-mountable enclosure is shaped to form a receptacle for receiving an electronic device with a display (e.g., the electronic device 103 shown in FIG. 1A). For example, in some implementations, the electronic device 103 shown in FIG. 1A can be slid into the HMD 104. In some implementations, the HMD 104 includes an integrated display for presenting a synthesized reality experience to the user 10. In some implementations, the controller 102 and/or the HMD 104 include at least a portion of the emergent content architectures in FIGS. 8A-8C.

Figure 2:
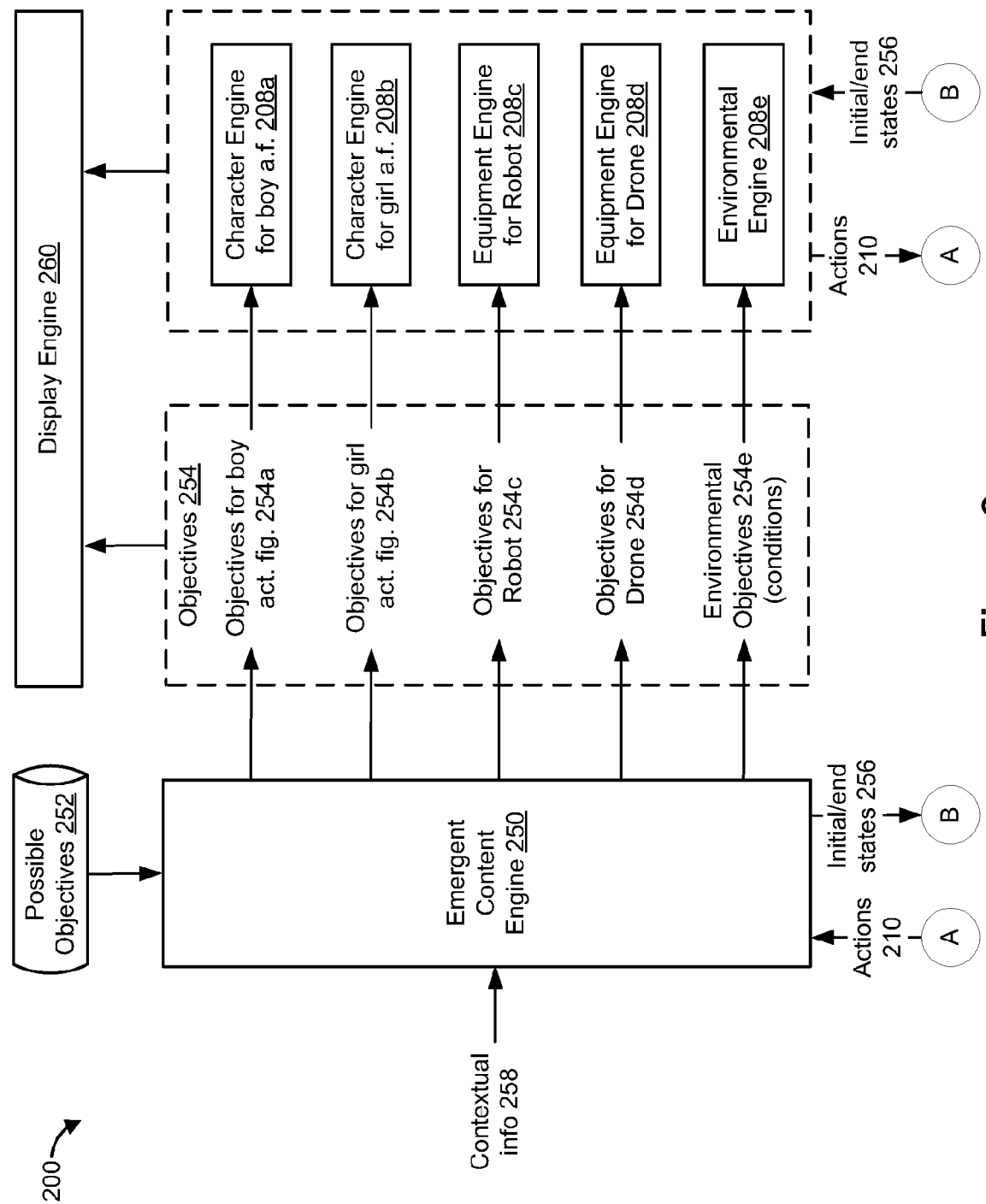
FIG. 2 is a block diagram of an example system in accordance with some implementations.

FIG. 2 is a block diagram of an example system 200 that generates objectives for various objective-effectuators in an SR setting. For example, the system 200 generates objectives for the boy action figure representation 108a, the girl action figure representation 108b, the robot representation 108c, and/or the drone representation 108d shown in FIGS.

1A and 1B. In the example of FIG. 2, the system 200 includes a boy action figure character engine 208a, a girl action figure character engine 208b, a robot equipment engine 208c, and a drone equipment engine 208d that generate actions 210 for the boy action figure representation 108a, the girl action figure representation 108b, the robot representation 108c, and the drone representation 108d, respectively. In some implementations, the system 200 also includes an environmental engine 208e, an emergent content engine 250, and a display engine 260.

In various implementations, the emergent content engine 250 generates respective objectives 254 for objective-effectuators that are in the SR setting and/or for the environment of the SR setting. In the example of FIG. 2, the emergent content engine 250 generates boy action figure objectives 251a for the boy action figure representation 108a, girl action figure objectives 254b for the girl action figure representation 108b, robot objectives 254c for the robot representation 108c, drone objectives 254d for the drone representation 108d, and/or environmental objectives 254e (e.g., environmental conditions) for the environment of the SR setting 106, As illustrated in FIG. 2, the emergent content engine 250 provides the objectives 254 to corresponding character/equipment/environmental engines. In the example of FIG. 2, the emergent content engine 250 provides the boy action figure objectives 254a to the boy action figure character engine 208a, the girl action figure objectives 254h to the girl action figure character engine 208b, the robot objectives 254c to the robot equipment engine 208c, the drone objectives 254d to the drone equipment engine 208d, and the environmental objectives 254e to the environmental engine 208e.

In various implementations, the emergent content engine 250 generates the objectives 254 based on a function of possible objectives 252 (e.g., a set of predefined objectives), contextual information 258 characterizing the SR setting, and actions 210 provided by the character/equipment/environmental engines. For example, in some implementations, the emergent content engine 250 generates the objectives 254 by selecting the objectives 254 from the possible objectives 252 based on the contextual information 258 and/or the actions 210. In some implementations, the possible objectives 252 are stored in a datastore. In some implementations, the possible objectives 252 are obtained from corresponding fictional source material (e.g., by scraping video games, movies, novels, and/or comics). For example, in some implementations, the possible objectives 252 for the girl action figure representation 108b include saving lives, rescuing pets, fighting crime, etc.

In some implementations, the emergent content engine 250 generates the objectives 254 based on the actions 210 provided by the character/equipment/environmental engines. In some implementations, the emergent content engine 250 generates the objectives 254 such that, given the actions 210, a probability of completing the objectives 254 satisfies a threshold (e.g., the probability is greater than the threshold, for example, the probability is greater than 80%). In some implementations, the emergent content engine 250 generates objectives 254 that have a high likelihood of being completed with the actions 210.

In some implementations, the emergent content engine 250 ranks the possible objectives 252 based on the actions 210. In some implementations, a rank for a particular possible objective 252 indicates the likelihood of completing that particular possible objective 252 given the actions 210. In such implementations, the emergent content engine 250 generates the objective 254 by selecting the highest N ranking possible objectives 252, where N is a predefined integer (e.g., 1, 3, 5, 10, etc.).

In some implementations, the emergent content engine 250 establishes initial/end states 256 for the SR setting based on the objectives 254. In some implementations, the initial/end states 256 indicate placements (e.g., locations) of various character/equipment representations within the SR setting. In some implementations, the SR setting is associated with a time duration (e.g., a few seconds, minutes, hours, or days). For example, the SR setting is scheduled to last for the time duration. In such implementations, the initial/end states 256 indicate placements of various character/equipment representations at/towards the beginning and/or at/towards the end of the time duration. In some implementations, the initial/end states 256 indicate environmental conditions for the SR setting at/towards the beginning/end of the time duration associated with the SR setting.

In some implementations, the emergent content engine 250 provides the objectives 254 to the display engine 260 in addition to the character/equipment/environmental engines. In some implementations, the display engine 260 determines whether the actions 210 provided by the character/equipment/environmental engines are consistent with the objectives 254 provided by the emergent content engine 250. For example, the display engine 260 determines whether the actions 210 satisfy objectives 254. In other words, in some implementations, the display engine 260 determines whether the actions 210 improve the likelihood of completing/achieving the objectives 254. In some implementations, if the actions 210 satisfy the objectives 254, then the display engine 260 modifies the SR setting in accordance with the actions 210. In some implementations, if the actions 210 do not satisfy the objectives 254, then the display engine 260 forgoes modifying the SR setting in accordance with the actions 210.

Figure 3A:
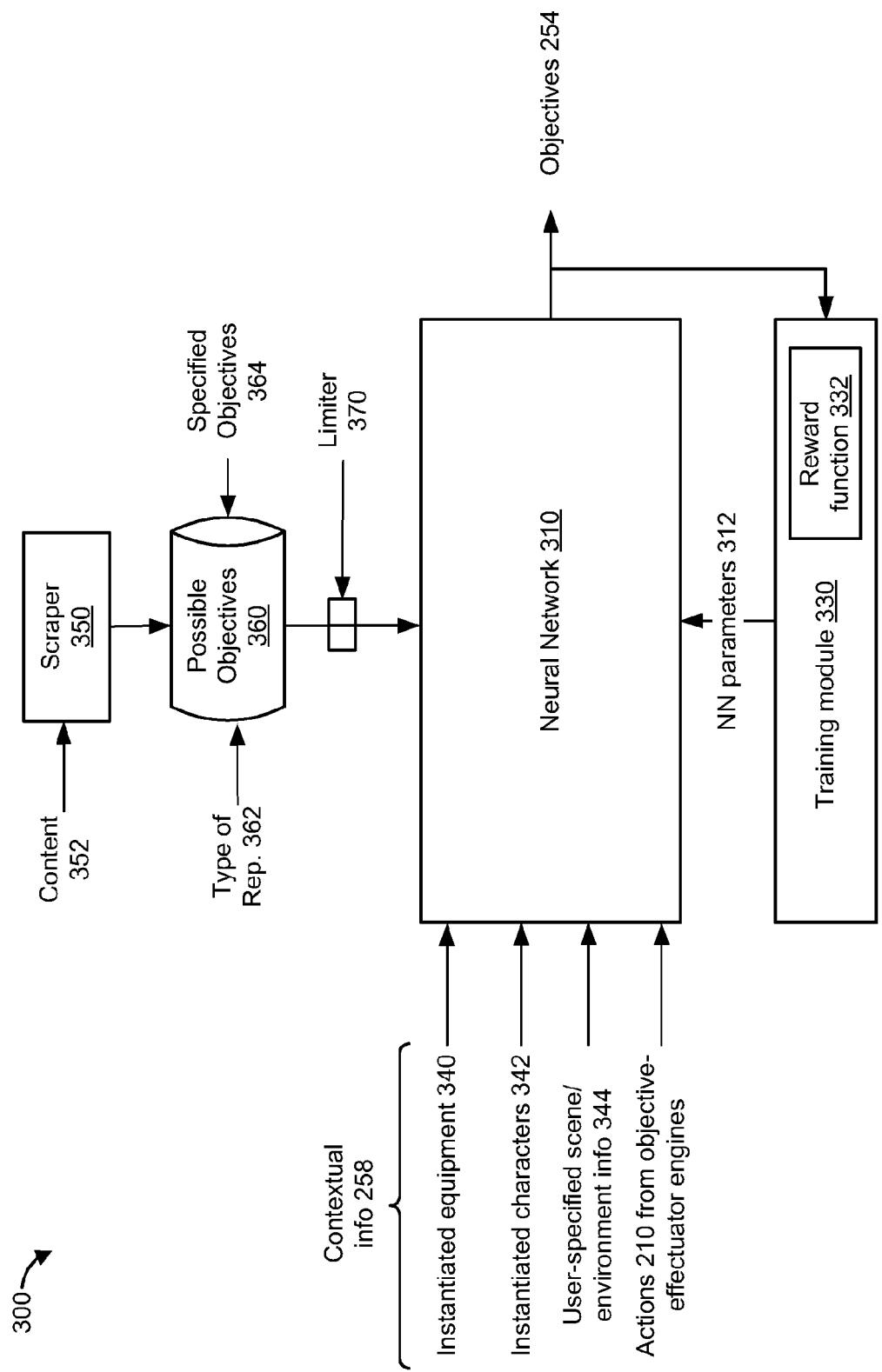
FIG. 3A is a block diagram of an example emergent content engine in accordance with some implementations.

FIG. 3A is a block diagram of an example emergent content engine 300 in accordance with some implementations. In some implementations, the emergent content engine 300 implements the emergent content engine 250 shown in FIG. 2. In various implementations, the emergent content engine 300 generates the objectives 254 for various objective-effectuators that are instantiated in an SR setting (e.g., character/equipment representations such as the boy action figure representation 108a, the girl action figure representation 108b, the robot representation 108c, and/or the drone representation 108d shown in FIGS. 1A and 1B). In some implementations, at least some of the objectives 254 are for an environmental engine (e.g., the environmental engine 208e shown in FIG. 2) that affects an environment of the SR setting.

In various implementations, the emergent content engine 300 includes a neural network system 310 ("neural network 310", hereinafter for the sake of brevity), a neural network training system 330 ("a training module 330", hereinafter for the sake of brevity) that trains (e.g., configures) the neural network 310, and a scraper 350 that provides possible objectives 360 to the neural network 310. In various implementations, the neural network 310 generates the objectives 254 (e.g., the objectives 254a for the boy action figure representation 108a, the objectives 254b for the girl action figure representation 108b, the objectives 254c for the robot representation 108c, the objectives 254d for the drone representation 108d, and/or the environmental objectives 254e shown in FIG. 2).

In some implementations, the neural network 310 includes a long short-term memory (LSTM) recurrent neural network (RNN). In various implementations, the neural network 310 generates the objectives 254 based on a function of the possible objectives 360. For example, in some implementations, the neural network 310 generates the objectives 254 by selecting a portion of the possible objectives 360. In some implementations, the neural network 310 generates the objectives 254 such that the objectives 254 are within a degree of similarity to the possible objectives 360.

In various implementations, the neural network 310 generates the objectives 254 based on the contextual information 258 characterizing the SR setting. As illustrated in FIG. 3A, in some implementations, the contextual information 258 indicates instantiated equipment representations 340, instantiated character representations 342, user-specified scene/environment information 344, and/or actions 210 from objective-effectuator engines.

In some implementations, the neural network 310 generates the objectives 254 based on the instantiated equipment representations 340. In some implementations, the instantiated equipment representations 340 refer to equipment representations that are located in the SR setting. For example, referring to FIGS. 1A and 1B, the instantiated equipment representations 340 include the robot representation 108c and the drone representation 108d in the SR setting 106. In some implementations, the objectives 254 include interacting with one or more of the instantiated equipment representations 340. For example, referring to FIGS. 1A and 1B, in some implementations, one of the objectives 254a for the boy action figure representation 108a includes destroying the robot representation 108c, and one of the objectives 254b for the girl action figure representation 108b includes protecting the robot representation 108c.

In some implementations, the neural network 310 generates the objectives 254 for each character representation based on the instantiated equipment representations 340. For example, referring to FIGS. 1A and 1B, if the SR setting 106 includes the robot representation 108c, then one of the objectives 254a for the boy action figure representation 108a includes destroying the robot representation 108c. However, if the SR setting 106 does not include the robot representation 108c, then the objective 254a for the boy action figure representation 108a includes maintaining peace within the SR setting 106.

In some implementations, the neural network 310 generates objectives 254 for each equipment representation based on the other equipment representations that are instantiated in the SR setting. For example, referring to FIGS. 1A and 1B, if the SR setting 106 includes the robot representation 108c, then one of the objectives 254d for the drone representation 108d includes protecting the robot representation 108c. However, if the SR setting 106 does not include the robot representation 108c, then the objective 254d for the drone representation 108d includes hovering at the center of the SR setting 106.

In some implementations, the neural network 310 generates the objectives 254 based on the instantiated character representations 342. In some implementations, the instantiated character representations 342 refer to character representations that are located in the SR setting. For example, referring to FIGS. 1A and 1B, the instantiated character representations 342 include the boy action figure representation 108a and the girl action figure representation 108b in the SR setting 106. In some implementations, the objectives 254 include interacting with one or more of the instantiated character representations 342. For example, referring to FIGS. 1A and 1B, in some implementations, one of the objectives 254d for the drone representation 108d includes following the girl action figure representation 108b. Similarly, in some implementations, one of the objectives 254c for the robot representation 108c include avoiding the boy action figure representation 108a.

In some implementations, the neural network 310 generates the objectives 254 for each character representation based on the other character representations that are instantiated in the SR setting. For example, referring to FIGS. 1A and 1B, if the SR setting 106 includes the boy action figure representation 108a, then one of the objectives 254b for the girl action figure representation 108b includes catching the boy action figure representation 108a. However, if the SR setting 106 does not include the boy action figure representation 108a, then the objective 254b for the girl action figure representation 108b includes flying around the SR setting 106.

In some implementations, the neural network 310 generates objectives 254 for each equipment representation based on the character representations that are instantiated in the SR setting. For example, referring to FIGS. 1A and 1B, if the SR setting 106 includes the girl action figure representation 108b, then one of the objectives 254d for the drone representation 108d includes following the girl action figure representation 108b. However, if the SR setting 106 does not include the girl action figure representation 108b, then the objective 254d for the drone representation 108d includes hovering at the center of the SR setting 106.

In some implementations, the neural network 310 generates the objectives 254 based on the user-specified scene/environment information 344. In some implementations, the user-specified scene/environment information 344 indicates boundaries of the SR setting. In such implementations, the neural network 310 generates the objectives 254 such that the objectives 254 can be satisfied (e.g., achieved) within the boundaries of the SR setting. In some implementations, the neural network 310 generates the objectives 254 by selecting a portion of the possible objectives 252 that are better suited for the environment indicated by the user-specified scene/environment information 344. For example, the neural network 310 sets one of the objectives 254d for the drone representation 108d to hover over the boy action figure representation 108a when the user-specified scene/environment information 344 indicates that the skies within the SR setting are clear. In some implementations, the neural network 310 forgoes selecting a portion of the possible objectives 252 that are not suitable for the environment indicated by the user-specified scene/environment information 344. For example, the neural network 310 forgoes the hovering objective for the drone representation 108d when the user-specified scene/environment information 344 indicates high winds within the SR setting.

In some implementations, the neural network 310 generates the objectives 254 based on the actions 210 provided by various objective-effectuator engines. In some implementations, the neural network 310 generates the objectives 254 such that the objectives 254 can be satisfied (e.g., achieved) given the actions 210 provided by the objective-effectuator engines. In some implementations, the neural network 310 evaluates the possible objectives 360 with respect to the actions 210. In such implementations, the neural network 310 generates the objectives 360 by selecting the possible objectives 360 that can be satisfied by the actions 210 and forgoing selecting the possible objectives 360 that cannot be satisfied by the actions 210.

In various implementations, the training module 330 trains the neural network 310. In some implementations, the training module 330 provides neural network (NN) parameters 312 to the neural network 310. In some implementations, the neural network 310 includes model(s) of neurons, and the neural network parameters 312 represent weights for the model(s). In some implementations, the training module 330 generates (e.g., initializes or initiates) the neural network parameters 312, and refines (e.g., adjusts) the neural network parameters 312 based on the objectives 254 generated by the neural network 310.

In some implementations, the training module 330 includes a reward function 332 that utilizes reinforcement learning to train the neural network 310. In some implementations, the reward function 332 assigns a positive reward to objectives 254 that are desirable, and a negative reward to objectives 254 that are undesirable. In some implementations, during a training phase, the training module 330 compares the objectives 254 with verification data that includes verified objectives. In such implementations, if the objectives 254 are within a degree of similarity to the verified objectives, then the training module 330 stops training the neural network 310. However, if the objectives 254 are not within the degree of similarity to the verified objectives, then the training module 330 continues to train the neural network 310. In various implementations, the training module 330 updates the neural network parameters 312 during/after the training.

In various implementations, the scraper 350 scrapes content 352 to identify the possible objectives 360. In some implementations, the content 352 includes movies, video games, comics, novels, and fan-created content such as blogs and commentary. In some implementations, the scraper 350 utilizes various methods, systems and/or devices associated with content scraping to scrape the content 352. For example, in some implementations, the scraper 350 utilizes one or more of text pattern matching, HTML (Hyper Text Markup Language) parsing, DOM (Document Object Model) parsing, image processing and audio analysis to scrape the content 352 and identify the possible objectives 360.

In some implementations, an objective-effectuator is associated with a type of representation 362, and the neural network 310 generates the objectives 254 based on the type of representation 362 associated with the objective-effectuator. In some implementations, the type of representation 362 indicates physical characteristics of the objective-effectuator (e.g., color, material type, texture, etc.). In such implementations, the neural network 310 generates the objectives 254 based on the physical characteristics of the objective-effectuator. In some implementations, the type of representation 362 indicates behavioral characteristics of the objective-effectuator (e.g., aggressiveness, friendliness, etc.). In such implementations, the neural network 310 generates the objectives 254 based on the behavioral characteristics of the objective-effectuator. For example, the neural network 310 generates an objective of being destructive for the boy action figure representation 108*a* in response to the behavioral characteristics including aggressiveness. In some implementations, the type of representation 362 indicates functional and/or performance characteristics of the objective-effectuator (e.g., strength, speed, flexibility, etc.). In such implementations, the neural network 310 generates the objectives 254 based on the functional characteristics of the objective-effectuator. For example, the neural network 310 generates an objective of always moving for the girl action figure representation 108*b* in response to the behavioral characteristics including speed. In some implementations, the type of representation 362 is determined based on a user input. In some implementations, the type of representation 362 is determined based on a combination of rules.

In some implementations, the neural network 310 generates the objectives 254 based on specified objectives 364. In some implementations, the specified objectives 364 are provided by an entity that controls (e.g., owns or created) the fictional material from where the character/equipment originated. For example, in some implementations, the specified objectives 364 are provided by a movie producer, a video game creator, a novelist, etc. In some implementations, the possible objectives 360 include the specified objectives 364. As such, in some implementations, the neural network 310 generates the objectives 254 by selecting a portion of the specified objectives 364.

In some implementations, the possible objectives 360 for an objective-effectuator are limited by a limiter 370. In some implementations, the limiter 370 restricts the neural network 310 from selecting a portion of the possible objectives 360. In some implementations, the limiter 370 is controlled by the entity that owns (e.g., controls) the fictional material from where the character/equipment originated. For example, in some implementations, the limiter 370 is controlled by a movie producer, a video game creator, a novelist, etc. In some implementations, the limiter 370 and the neural network 310 are controlled/operated by different entities. In some implementations, the limiter 370 restricts the neural network 310 from generating objectives that breach a criterion defined by the entity that controls the fictional material.

Figure 3B:
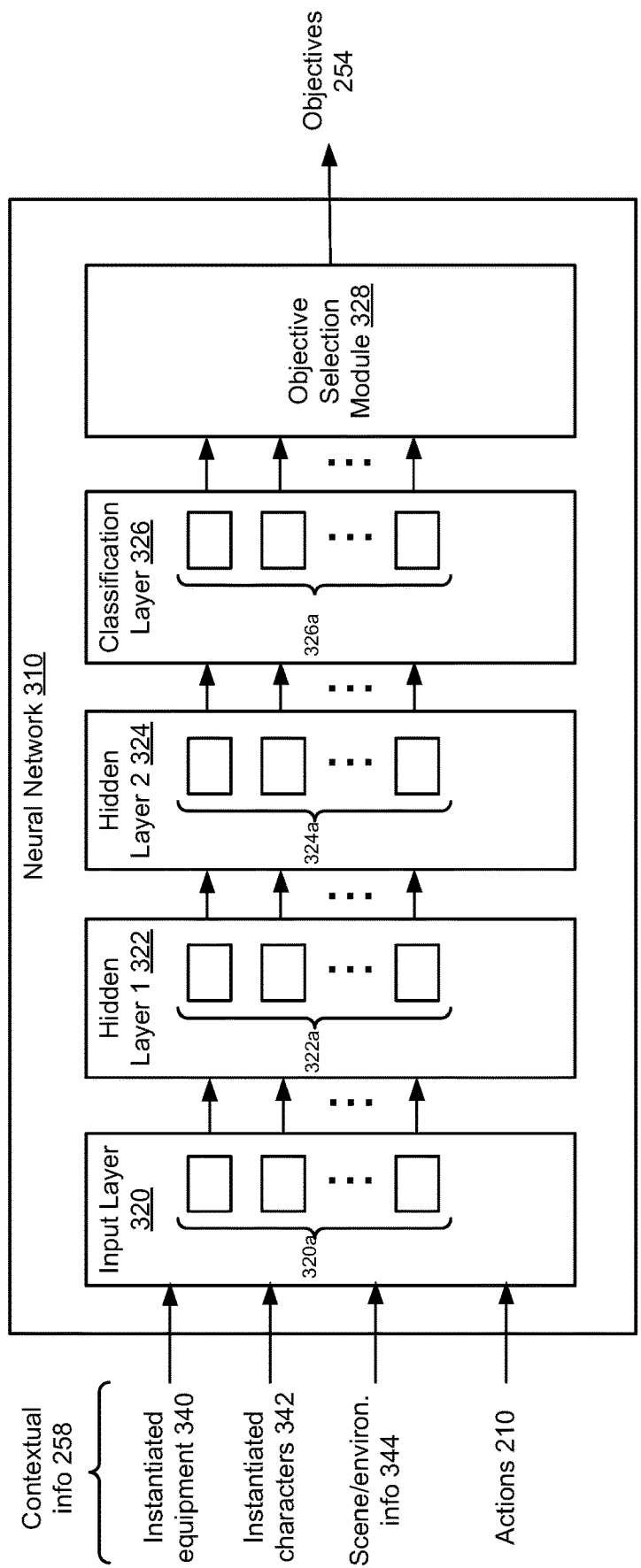
FIG. 3B is a block diagram of an example neural network in accordance with some implementations.

FIG. 3B is a block diagram of the neural network 310 in accordance with some implementations. In the example of FIG. 3B, the neural network 310 includes an input layer 320, a first hidden layer 322, a second hidden layer 324, a classification layer 326, and an objective selection module 328. While the neural network 310 includes two hidden layers as an example, those of ordinary skill in the art will appreciate from the present disclosure that one or more additional hidden layers are also present in various implementations. Adding additional hidden layers adds to the computational complexity and memory demands, but may improve performance for some applications.

In various implementations, the input layer 320 receives various inputs. In some implementations, the input layer 320 receives the contextual information 258 as input. In the example of FIG. 3B, the input layer 320 receives inputs indicating the instantiated equipment 340, the instantiated characters 342, the user-specified scene/environment information 344, and the actions 210 from the objective-effectuator engines. In some implementations, the neural network 310 includes a feature extraction module (not shown) that generates a feature stream (e.g., a feature vector) based on the instantiated equipment 340, the instantiated characters 342, the user-specified scene/environment information 344, and/or the actions 210. In such implementations, the feature extraction module provides the feature stream to the input layer 320. As such, in some implementations, the input layer 320 receives a feature stream that is a function of the instantiated equipment 340, the instantiated characters 342, the user-specified scene/environment information 344, and the actions 210. In various implementations, the input layer 320 includes a number of LSTM logic elements 320*a*, which are also referred to as neurons or models of neurons by those of ordinary skill in the art. In some such implementations, an input matrix from the features to the LSTM logic elements 320*a* includes rectangular matrices. The size of this matrix is a function of the number of features included in the feature stream.

In some implementations, the first hidden layer 322 includes a number of LSTM logic elements 322*a*. As illustrated in the example of FIG. 3B, the first hidden layer 322 receives its inputs from the input layer 320.

In some implementations, the second hidden layer 324 includes a number of LSTM logic elements 324a. In some implementations, the number of LSTM logic elements 324a is the same as or similar to the number of LSTM logic elements 320a in the input layer 320 or the number of LSTM logic elements 322a in the first hidden layer 322. As illustrated in the example of FIG. 3B, the second hidden layer 324 receives its inputs from the first hidden layer 322. Additionally or alternatively, in some implementations, the second hidden layer 324 receives its inputs from the input layer 320.

In some implementations, the classification layer 326 includes a number of LSTM logic elements 326a. In some implementations, the number of LSTM logic elements 326a is the same as or similar to the number of LSTM logic elements 320a in the input layer 320, the number of LSTM logic elements 322a in the first hidden layer 322 or the number of LSTM logic elements 324a in the second hidden layer 324. In some implementations, the classification layer 326 includes an implementation of a multinomial logistic function (e.g., a soft-max function) that produces a number of outputs that is approximately equal to the number of possible actions 360. In some implementations, each output includes a probability or a confidence measure of the corresponding objective being satisfied by the actions 210. In some implementations, the outputs do not include objectives that have been excluded by operation of the limiter 370.

In some implementations, the objective selection module 328 generates the objectives 254 by selecting the top N objective candidates provided by the classification layer 326. In some implementations, the top N objective candidates are likely to be satisfied by the actions 210. In some implementations, the objective selection module 328 provides the objectives 254 to a rendering and display pipeline (e.g., the display engine 260 shown in FIG. 2). In some implementations, the objective selection module 328 provides the objectives 254 to one or more objective-effectuator engines (e.g., the boy action figure character engine 208a, the girl action figure character engine 208b, the robot equipment engine 208c, the drone equipment engine 208d, and/or the environmental engine 208e shown in FIG. 2).

Figure 4A:
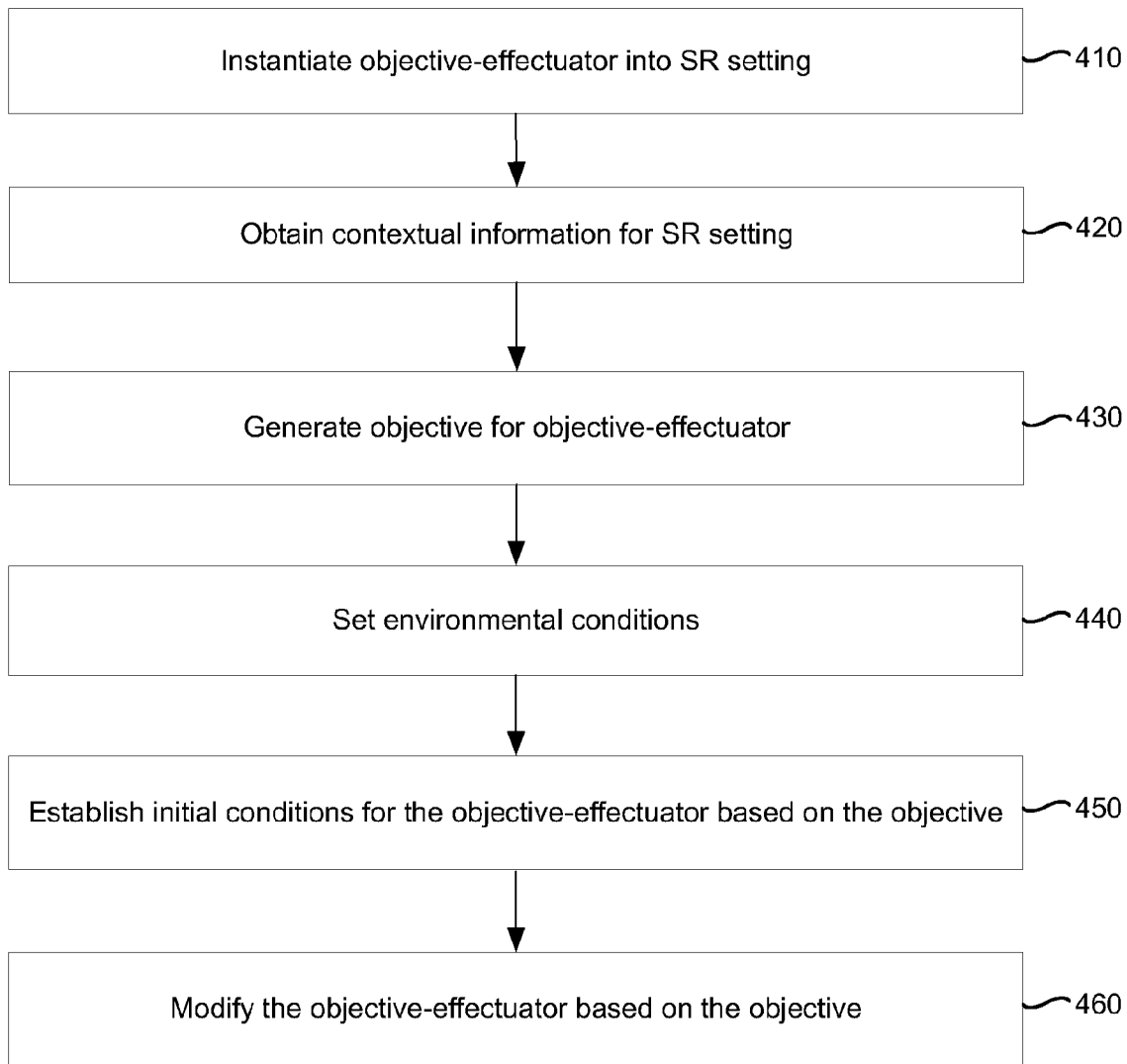
FIGS. 4A-4E are flowchart representations of a method of generating content for SR settings in accordance with some implementations.

FIG. 4A is a flowchart representation of a method 400 of generating content for SR settings. In various implementations, the method 400 is performed by a device with a non-transitory memory and one or more processors coupled with the non-transitory memory (e.g., the controller 102, the electronic device 103 shown in FIG. 1A, and/or the HMD 104 shown in FIG. 1B). In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, in some implementations, the method 400 includes instantiating an objective-effectuator into an SR setting, obtaining contextual information for the SR setting, generating an objective for the objective-effectuator, setting environmental conditions for the SR setting, establishing initial conditions for the objective-effectuator based on the objective, and modifying the objective-effectuator based on the objective.

As represented by block 410, in various implementations, the method 400 includes instantiating an objective-effectuator into an SR setting (e.g., instantiating the boy action figure representation 108a, the girl action figure representation 108b, the robot representation 108c, and/or the drone representation 108d into the SR setting 106 shown in FIGS. 1A and 1B). In some implementations, the objective-effectuator is characterized by a set of predefined objectives (e.g., the possible objectives 360 shown in FIG. 3A) and a set of visual rendering attributes.

As represented by block 420, in various implementations, the method 400 includes obtaining contextual information characterizing the SR setting (e.g., the contextual information 258 shown in FIGS. 2-3B). In some implementations, the method 400 includes receiving the contextual information (e.g., from a user).

As represented by block 430, in various implementations, the method 400 includes generating an objective for the objective-effectuator based on a function of the set of predefined objectives, the contextual information, and a set of predefined actions for the objective-effectuator. For example, referring to FIG. 2, the method 400 includes generating the objectives 254 based on the possible objectives 252, the contextual information 258, and the actions 210.

As represented by block 440, in various implementations, the method 400 includes setting environmental conditions for the SR setting based on the objective for the objective-effectuator. For example, referring to FIG. 2, the method 400 includes generating the environmental objectives 254e (e.g., the environmental conditions).

As represented by block 450, in various implementations, the method 400 includes establishing initial conditions and a current set of actions for the objective-effectuator based on the objective for the objective-effectuator. For example, referring to FIG. 2, the method 400 include establishing the initial/end states 256 for various objective-effectuators (e.g., character representations, equipment representations and/or the environment).

As represented by block 460, in various implementations, the method 400 includes modifying the objective-effectuator based on the objective. For example, referring to FIG. 2, in some implementations, the method 400 includes providing the objectives 254 to the display engine 260 and/or to one or more objective-effectuator engines.

Figure 4B:
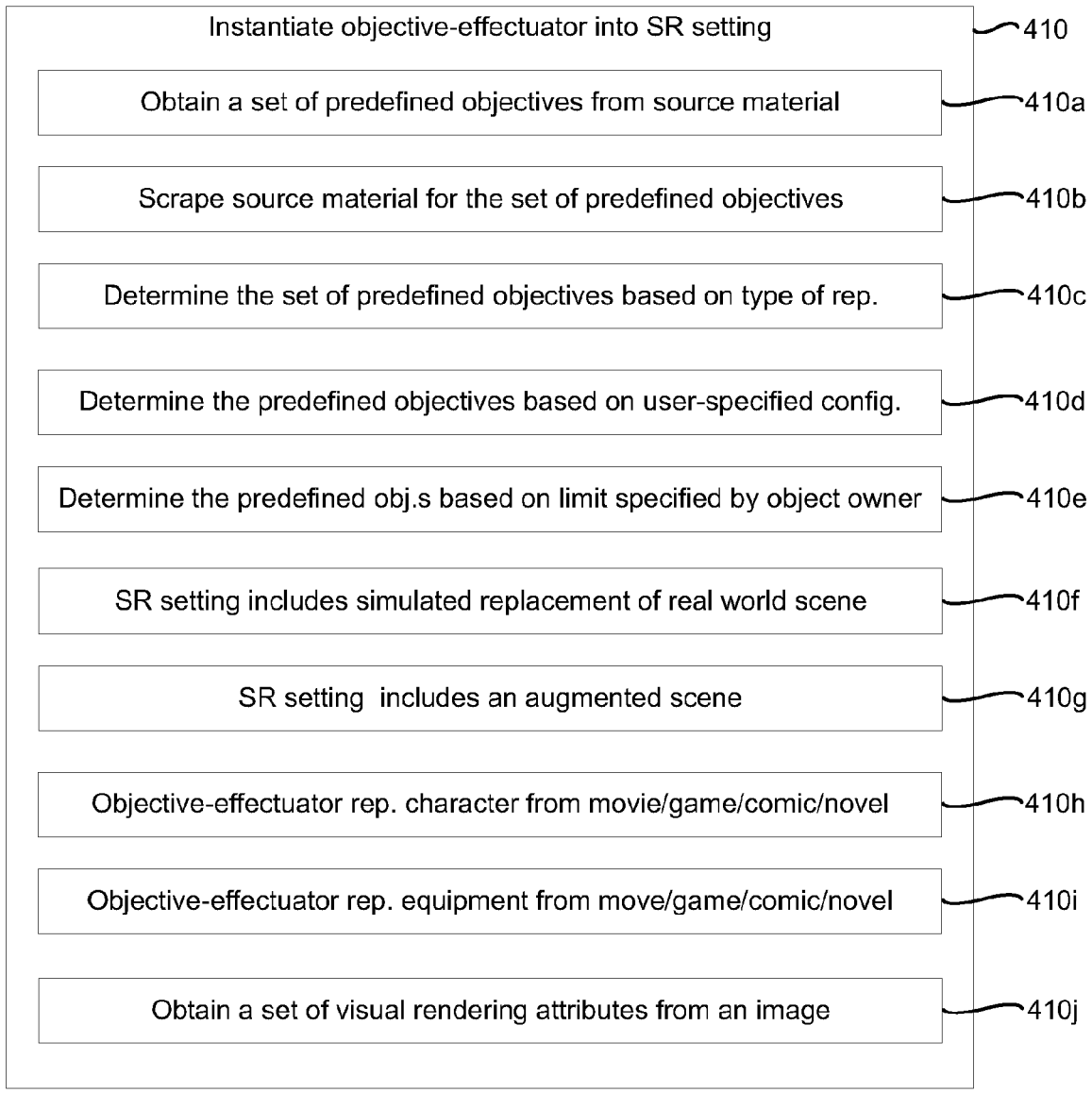

Referring to FIG. 4B, as represented by block 410a, in various implementations, the method 400 includes obtaining a set of predefined objectives (e.g., the possible objectives 360 shown in FIG. 3A) from source material (e.g., the content 352 shown in FIG. 3A, for example, movies, books, video games, comics, and/or novels). As represented by block 410b, in various implementations, the method 400 includes scraping the source material for the set of predefined objectives.

As represented by block 410c, in some implementations, the method 400 includes determining the set of predefined objectives based on a type of representation (e.g., the type of representation 362 shown in FIG. 3A). As represented by block 410d, in some implementations, the method 400 includes determining the set of predefined objectives based on user-specified configuration (e.g., the type of representation 362 shown in FIG. 3A is determined based on a user input).

As represented by block 410e, in some implementations, the method 400 includes determining the predefined objectives based on a limit specified by an object owner. For example, referring to FIG. 3A, in some implementations, the method 400 includes limiting the possible objectives 360 selectable by the neural network 310 by operation of the limiter 370.

As represented by block 410*f*, in some implementations, the SR setting (e.g., the SR setting 106 shown in FIGS. 1A and 1B) include an SR setting that is a simulated replacement of a real-world scene.

As represented by block 410*g*, in some implementations, the SR setting (e.g., the SR setting 106 shown in FIGS. 1A and 1B) includes an augmented scene that is a modified version of a real-world scene.

As represented by block 410*h*, in some implementations, the objective-effectuator is a representation of a character (e.g., the boy action figure representation 108*a* and/or the girl action figure representation 108*b* shown in FIGS. 1A and 1B) from one or more of a movie, a video game, a comic, a novel, or the like.

As represented by block 410*i*, in some implementations, the objective-effectuator is a representation of an equipment (e.g., the robot representation 108*c* and/or the drone representation 108*d* shown in FIGS. 1A and 1B) from one or more of a movie, a video game, a comic, a novel, or the like.

As represented by block 410*j*, in some implementations, the method 400 includes obtaining a set of visual rendering attributes from an image. For example, in some implementations, the method 400 includes capturing an image and extracting the visual rendering attributes from the image (e.g., by utilizing devices, methods, and/or systems associated with image processing).

Figure 4C:
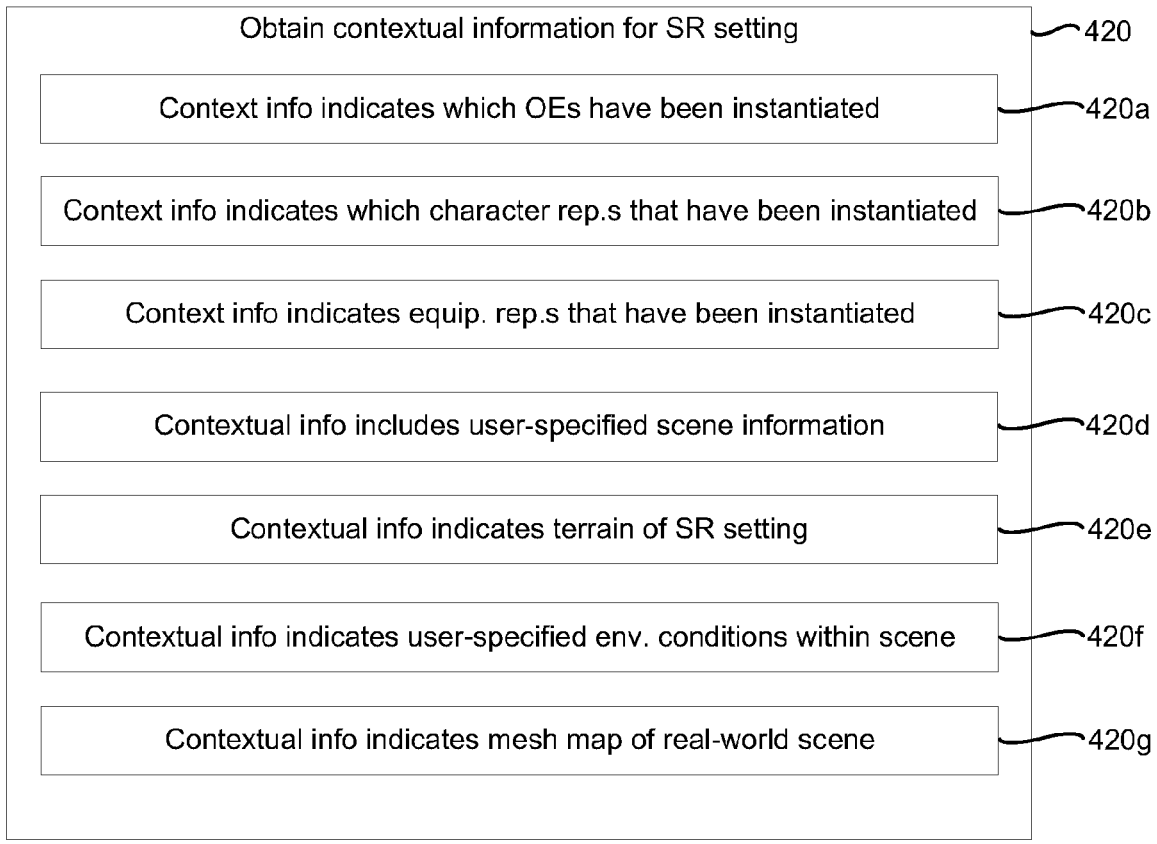

Referring to FIG. 4C, as represented by block 420*a*, in various implementations, the contextual information indicates whether objective-effectuators have been instantiated in the SR setting. As represented by block 420*b*, in some implementations, the contextual information indicates which character representations have been instantiated in the SR setting (e.g., the contextual information includes the instantiated characters representation 342 shown in FIGS. 3A-3B). As represented by block 420*c*, in some implementations, the contextual information indicates equipment representations that have been instantiated in the SR setting (e.g., the contextual information includes the instantiated equipment representations 340 shown in FIGS. 3A-3B).

As represented by block 420*d*, in various implementations, the contextual information includes user-specified scene information (e.g., user-specified scene/environment information 344 shown in FIGS. 3A-3B). As represented by block 420*e*, in various implementations, the contextual information indicates a terrain (e.g., a landscape, for example, natural artifacts such as mountains, rivers, etc.) of the SR setting. As represented by block 420*f*, in various implementations, the contextual information indicates environmental conditions within the SR setting (e.g., the user-specified scene/environmental information 344 shown in FIGS. 3A-3B).

As represented by block 420*g*, in some implementations, the contextual information includes a mesh map of a real-world scene (e.g., a detailed representation of the real-world scene where the device is located). In some implementations, the mesh map indicates positions and/or dimensions of real-world artifacts that are located at the real-world scene.

Figure 4D:
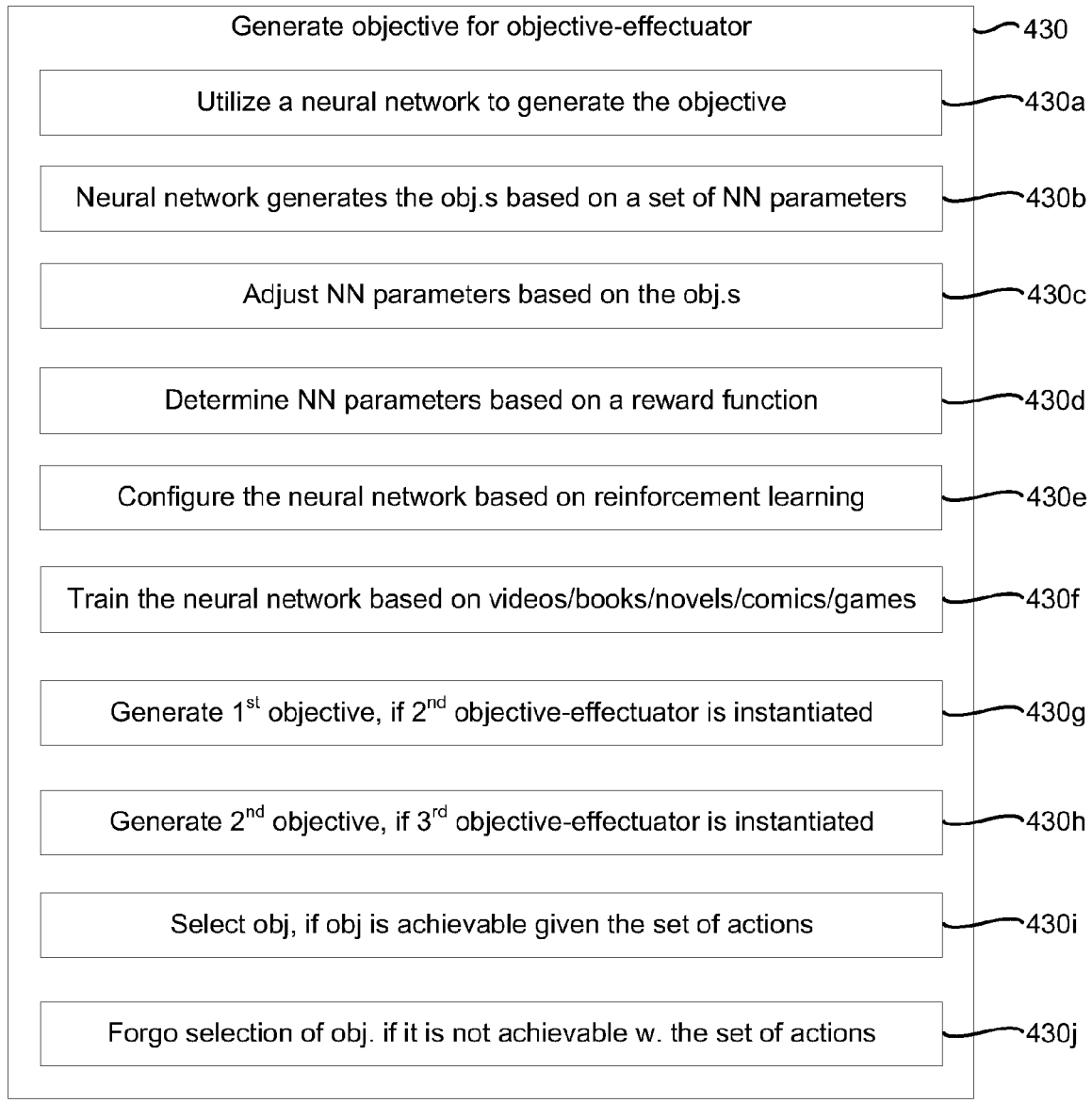

Referring to FIG. 4D, as represented by block 430*a*, in some implementations, the method 400 includes utilizing a neural network (e.g., the neural network 310 shown in FIGS. 3A-3B) to generate the objectives. As represented by block 430*b*, in some implementations, the neural network generates the objectives based on a set of neural network parameters (e.g., the neural network parameters 312 shown in FIG. 3A). As represented by block 430*c*, in some implementations, the method 400 includes adjusting the neural network parameters based on the objectives generated by the neural network (e.g., adjusting the neural network parameters 312 based on the objectives 254 shown in FIG. 3A).

As represented by block 430*d*, in some implementations, the method 400 includes determining neural network parameters based on a reward function (e.g., the reward function 332 shown in FIG. 3A) that assigns a positive reward to desirable objectives and a negative reward to undesirable objectives. As represented by block 430*e*, in some implementations, the method 400 includes configuring (e.g., training) the neural network based on reinforcement learning. As represented by block 430*f*, in some implementations, the method 400 includes training the neural network based on content scraped (e.g., by the scraper 350 shown in FIG. 3A) from videos such as movies, books such as novels and comics, and video games.

As represented by block 430*g*, in some implementations, the method 400 includes generating a first objective if a second objective-effectuator is instantiated in the SR setting. As represented by block 430*h*, in some implementations, the method 400 includes generating a second objective if a third objective-effectuator is instantiated in the SR setting. More generally, in various implementations, the method 400 includes generating different objectives for an objective-effectuator based on the other objective-effectuators that are present in the SR setting.

As represented by block 430*i*, in some implementations, the method 400 includes selecting an objective if, given a set of actions, the likelihood of the objective being satisfied is greater than a threshold. As represented by block 430*j*, in some implementations, the method 400 includes forgoing selecting an objective if, given the set of actions, the likelihood of the objective being satisfied is less than the threshold.

Figure 4E:
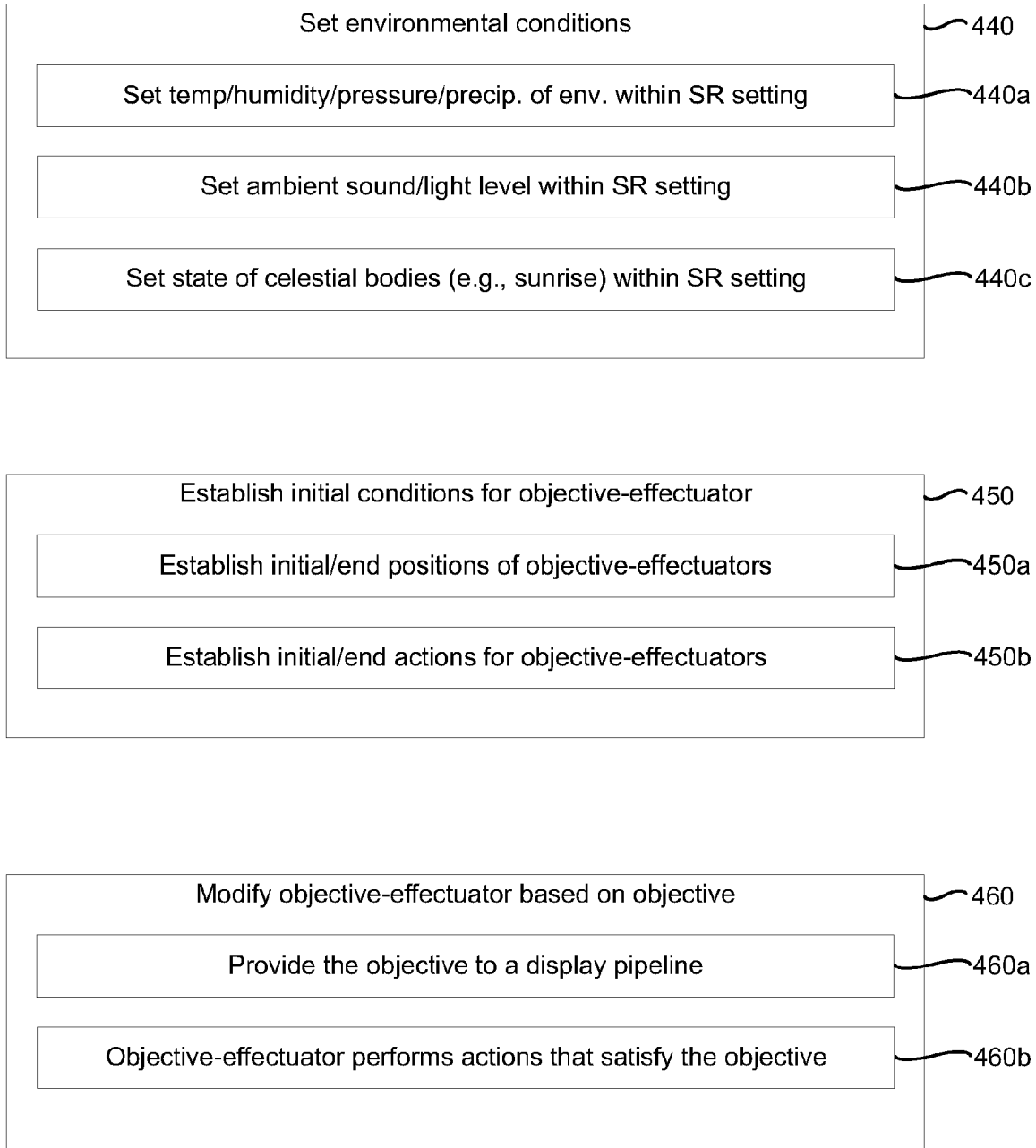

Referring to FIG. 4E, as represented by block 440*a*, in some implementations, the method 400 includes setting one or more of a temperature value, a humidity value, a pressure value and a precipitation value within the SR setting. In some implementations, the method 400 includes making it rain or snow in the SR setting. As represented by block 440*b*, in some implementations, the method 400 includes setting one or more of an ambient sound level value (e.g., in decibels) and an ambient lighting level value (e.g., in lumens) for the SR setting. As represented by block 440*c*, in some implementations, the method 400 includes setting states of celestial bodies within the SR setting (e.g., setting a sunrise or a sunset, setting a full moon or a partial moon, etc.).

As represented by block 450*a*, in some implementations, the method 400 includes establishing initial/end positions of objective-effectuators. In some implementations, the SR setting is associated with a time duration. In such implementations, the method 400 includes setting initial positions that the objective-effectuators occupy at or near the beginning of the time duration, and/or setting end positions that the objective-effectuators occupy at or near the end of the time duration.

As represented by block 450*b*, in some implementations, the method 400 includes establishing initial/end actions for objective-effectuators. In some implementations, the SR setting is associated with a time duration. In such implementations, the method 400 includes establishing initial actions that the objective-effectuators perform at or near the beginning of the time duration, and/or establishing end actions that the objective-effectuators perform at or near the end of the time duration.

As represented by block 460*a*, in some implementations, the method 400 includes providing the objectives to a rendering and display pipeline (e.g., the display engine 260 shown in FIG. 2). As represented by block 460b, in some implementations, the method 400 includes modifying the objective-effectuator such that the objective-effectuator can be seen as performing actions that satisfy the objectives.

Figure 5:
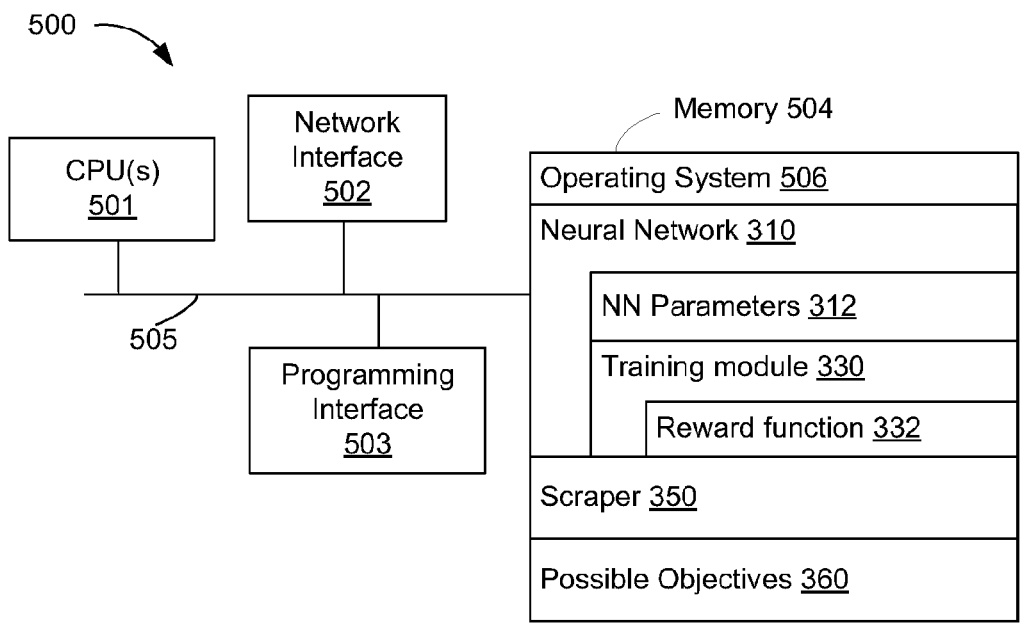
FIG. 5 is a block diagram of a server system enabled with various components of the emergent content engine in accordance with some implementations.

FIG. 5 is a block diagram of a server system 500 enabled with one or more components of a device (e.g., the controller 102, the electronic device 103 shown in FIG. 1A, and/or the HMD 104 shown in FIG. 1B) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations, the server system 500 includes one or more processing units (CPUs) 501, a network interface 502, a programming interface 503, a memory 504, and one or more communication buses 505 for interconnecting these and various other components.

In some implementations, the network interface 502 is provided to communicate with one or more local devices (e.g., via near-field communication or a local network) and/or one or more remote devices (e.g., WiFi, Ethernet, etc.). In some implementations, the one or more communication buses 505 include circuitry that interconnects and controls communications between system components. The memory 504 includes high-speed random-access memory, such as DRAM, SRAM, DDR RAM or other random-access solid-state memory devices, and may include non-volatile memory, such as one or more magnetic disk storage devices, optical disk storage devices, flash memory devices, or other non-volatile solid-state storage devices. The memory 504 optionally includes one or more storage devices remotely located from the one or more CPUs 501. The memory 504 comprises a non-transitory computer readable storage medium.

In some implementations, the memory 504 or the non-transitory computer readable storage medium of the memory 504 stores the following programs, modules and data structures, or a subset thereof including an optional operating system 506, the neural network 310, the training module 330, the scraper 350, and the possible objectives 360. As described herein, the neural network 310 is associated with the neural network parameters 312. As described herein, the training module 330 includes a reward function 332 that trains (e.g., configures) the neural network 310 (e.g., by determining the neural network parameters 312). As described herein, the neural network 310 determines objectives (e.g., the objectives 254 shown in FIGS. 2-3B) for objective-effectuators in an SR setting and/or for the environment of the SR setting. In some implementations, the memory 504 include at least a portion of the emergent content architectures in FIGS. 8A-8C.

In some implementations, the electronic device 500 optionally includes one or more input devices such as an eye tracker, touch-sensitive surface, keypad or keyboard, accelerometer, gyroscope, inertial measurement unit (IMU), grip sensor, one or more microphones, one or more buttons, one or more interior-facing image sensors, one or more exterior-facing image sensors, one or more depth sensors, one or more physiological sensors (e.g., heartbeat sensor, glucose level detector, etc.), one or more environmental sensors (e.g., barometer, humidity sensor, thermometer, ambient light detector, etc.), and/or the like. In some implementations, the electronic device 500 optionally includes one or more output/feedback devices such as a haptics engine, skin shear engine, one or more displays, one or more speakers, and/or the like.

Figure 6A:
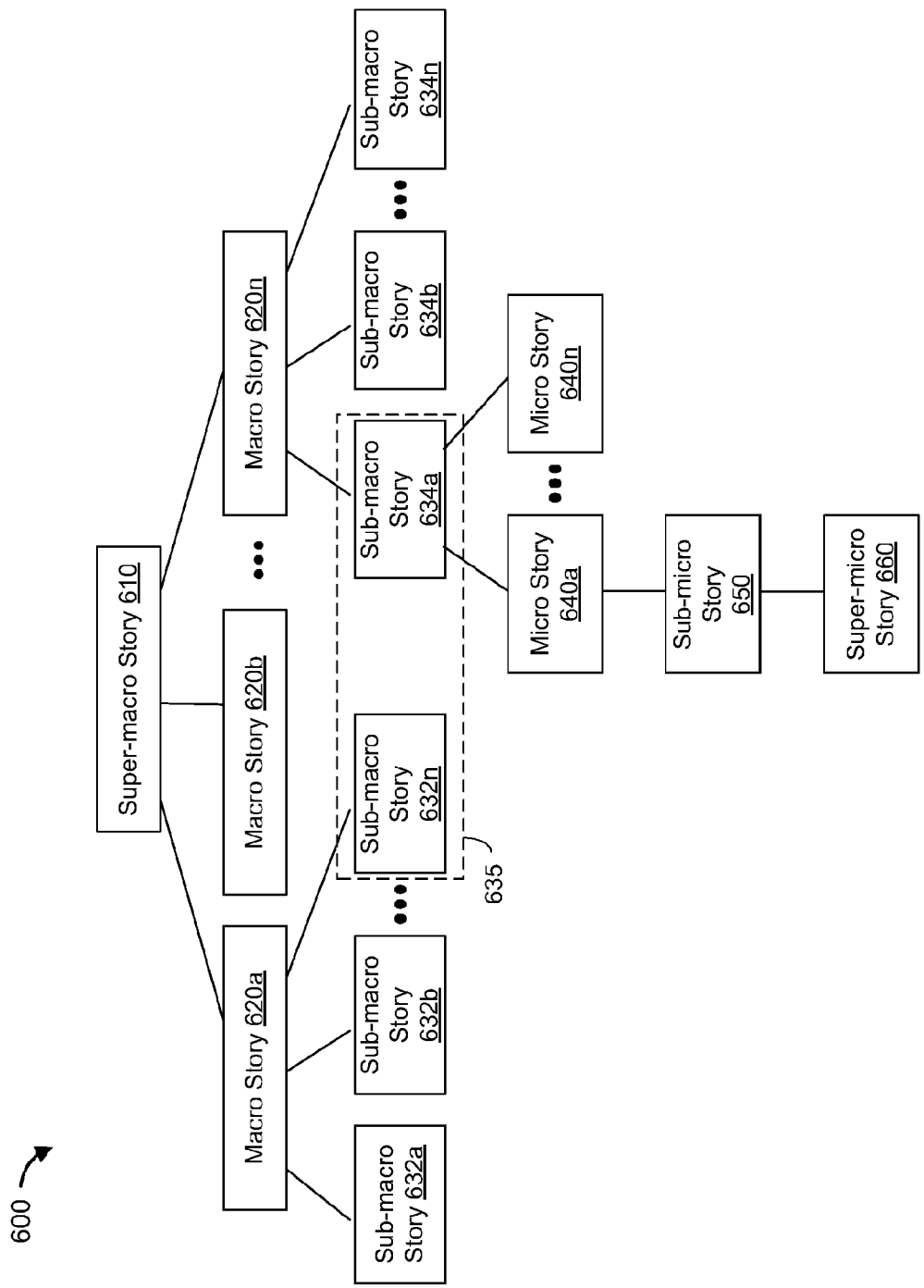
FIG. 6A is a block diagram of conditionally dependent synthesized reality (SR) content threads in accordance with some implementations.

FIG. 6A is a block diagram of conditionally dependent SR content threads 600 in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations, the conditionally dependent SR content threads 600 correspond to a mesh of related content threads (e.g., stories, narratives, etc.) associated with a movie, TV episode, novel, theatrical play, or event such as an athletic event, ritual, coronation, inauguration, concert, opera, theatrical performance, battle, or other large-scale occurrence.

According to some implementations, the conditionally dependent SR content threads 600 includes a plurality of content threads (sometime also referred to herein as "stories" or "story nodes" for the sake of brevity) that are linked together in a tree, mesh, or web of inter-related stories. In some implementations, each of the plurality of stories within the conditionally dependent SR content threads 600 corresponds to a particular point-of-view of the event. In some implementations, each of the plurality of stories within the conditionally dependent SR content threads 600 is based on source assets/materials including, for example, plans for the event such as battle plans or an order of battle, ground truth for the event such as the course and outcomes of the battle, historical accounts and books, movies, video games, novels, and/or the like.

According to some implementations, the root of the conditionally dependent SR content threads 600 includes a super-macro story 610, which is, in turn, associated with one or more macro stories 620a, 620b, . . . , 620n (sometimes collectively referred to herein as macro stories 620). As shown in FIG. 6A, in some implementations, each of the macro stories 620 is associated with one or more sub-macro stories. For example, the macro story 620a is associated with sub-macro stories 632a, 632b, . . . , 632n (sometimes collectively referred to herein as sub-macro stories 632), and the macro story 620n is associated with sub-macro stories 634a, 634b, . . . , 634n (sometimes collectively referred to herein as sub-macro stories 634).

As shown in FIG. 6A, in some implementations, each of the sub-macro stories is associated with one or more micro stories. For example, the sub-macro story 634a is associated with micro stories 640a, . . . , 640n (sometimes collectively referred to herein as micro stories 640). In some implementations, each of the micro stories 640 is associated with one or more sub-micro stories and, in turn, each of the sub-micro stories is associated with one or more super-micro stories. As shown in FIGS. 6, for example, the micro story 640a is associated with a sub-micro story 650, and the sub-micro story 650 is associated with a super-micro story 660.

As one example, the super-macro story 610 corresponds to the overall story associated with a particular battle of a war in the historical records. Continuing with this example, the macro stories 620 correspond to various military branches for the countries involved in a particular battle. As such, in this example, the macro story 620n corresponds to a naval military branch. Continuing with this example, the sub-macro stories 634 correspond to individual ships. As such, in this example, the sub-macro story 634a corresponds to a particular transport ship.

As shown in FIG. 6A, there is a relationship 635 between the sub-macro story 632n corresponding to a squadron of aircraft and the sub-macro story 634a. In this example, the squadron of aircraft are providing air support and defense for the particular transport ship (among other transport ships).

Continuing with this example, the micro stories 640 correspond to a plurality of amphibious landing craft being transported by the particular transport ship. Continuing with this example, the sub-micro story 650 corresponds to a platoon of infantry or marines assigned to respective amphibious landing craft among the plurality of amphibious landing craft being transported by the particular transport ship. Continuing with this example, the super-micro story 660 corresponds to a particular infantryman or marine assigned to the respective amphibious landing craft.

In some implementations, a user is presented SR content associated with an omniscient third-person view of the super-macro story 610 (e.g., a particular battle). The user may switch to another point-of-view within the conditionally dependent SR content threads 600 in order to view SR content associated with the selected point-of-view within the conditionally dependent SR content threads 600 such as the perspective of the naval military branch associated with macro story 620n, the perspective of the particular transport ship associated with the sub-macro story 634a, the perspective of the respective amphibious landing craft 640a, the perspective of the platoon of infantry or marines associated with sub-micro story 650, or the perspective the particular infantryman or marine assigned to the respective amphibious landing craft associated with the super-micro story 660.

According to some implementations, a node of the conditionally dependent SR content threads 600 may be removed by the user in order to view a simulation of the event that excludes the particular node and associated child nodes. According to some implementations, anode may be added to the conditionally dependent SR content threads 600 by the user in order to view a simulation of the event that includes the particular node and associated child nodes.

Figure 6B:
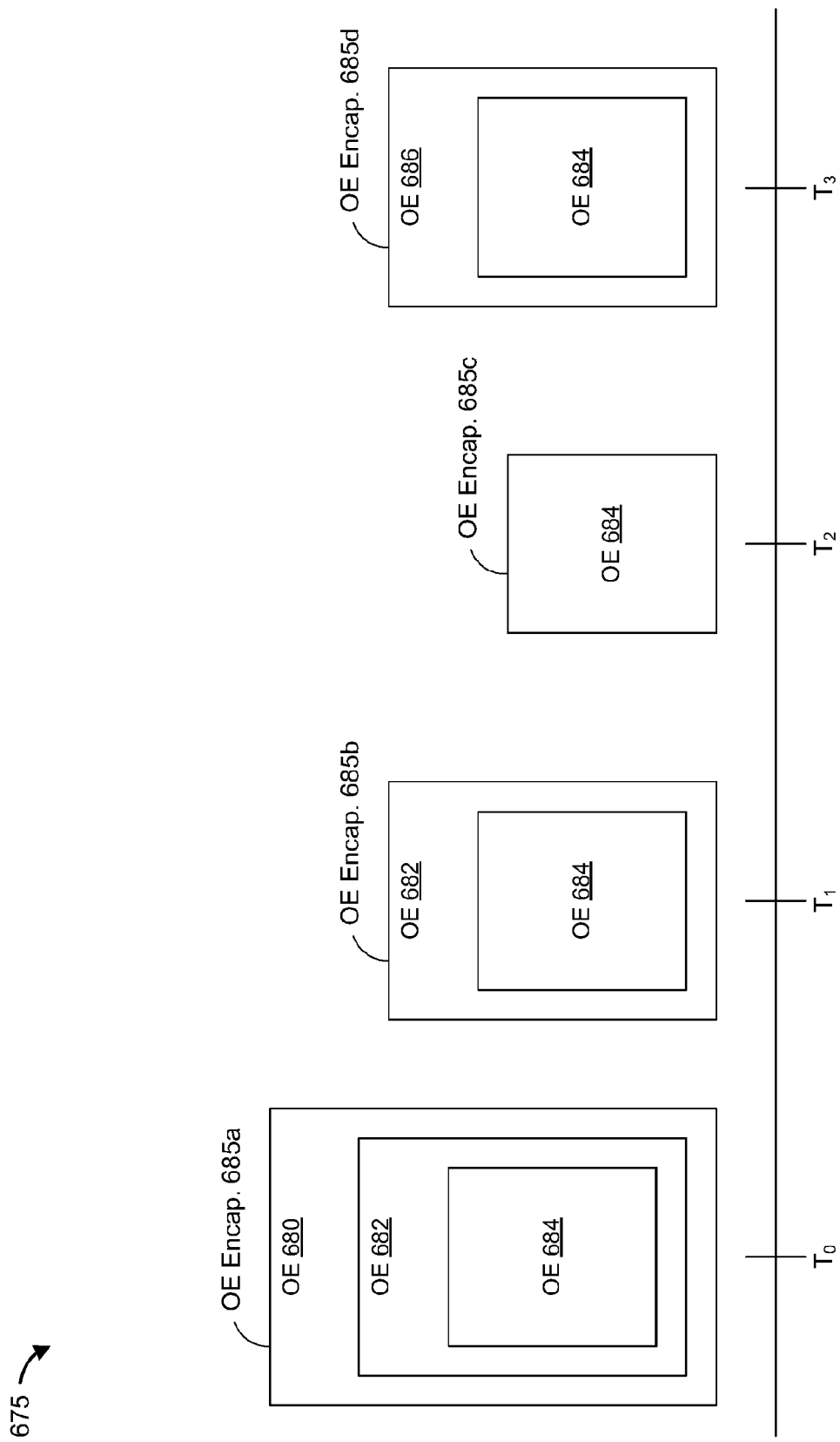
FIGS. 6B and 6C illustrate timelines associated with objective-effectuator (OE) encapsulations in accordance with some implementations.

FIG. 6B is a block diagram of a timeline 675 associated with an objective-effectuator (OE) encapsulation in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, as shown in FIG. 6B, the timeline 675 illustrates the state of an OE encapsulation from the point-of-view of a lowest-level OE 684 at a plurality of time periods or temporal points $T_0$, $T_1$, $T_2$, and $T_3$.

In some implementations, an OE encapsulation includes a plurality of conditional, related, correlated, associated, or dependent OEs that are encapsulated or nested based on contextual information. In some implementations, each OE corresponds to a character within a synthesized reality (SR) setting. As one example, an OE encapsulation corresponds to a set of related characters or entities such as a transport ship including N amphibious landing crafts each with M marines. In this example, the lowest-level OE is an individual marine that is encapsulated/nested within his company, which, in turn, is encapsulated/nested within the amphibious land craft. Continuing with this example, the amphibious land craft is encapsulated/nested within the transport ship.

In some implementations, when the first OE is encapsulated within the second OE, the first OE is associated with the second OE. In some implementations, when the first OE is encapsulated within the second OE, the first OE is correlated with the second OE. In some implementations, when the first OE is encapsulated within the second OE, the first OE is related to the second OE. In some implementations, when the first OE is encapsulated within the second OE, the first OE is dependent on the second OE. In other words, the first OE is provided objectives and performs actions that are consistent with the context and attributes of the second OE because the first OE is encapsulated within the second OE.

As shown in FIG. 6B, at time $T_0$, the OE encapsulation 685a includes an OE 684 encapsulated/nested within an OE 682, which, in turn, is encapsulated/nested within an OE 680. For example, at time $T_0$, while approaching a beach to make an amphibious landing, the OE encapsulation 685a includes the OE 684 (e.g., an individual marine) encapsulated/nested within the OE 682 (e.g., a company of marines), which, in turn, is encapsulated/nested within an OE 680 (e.g., an amphibious landing craft).

In some implementations, when a first OE is encapsulated/nested within a second OE, the first OE is provided an objective based on the context of the second OE within which it is encapsulated and, in turn, the first OE performs actions that are consistent with that context. As an example, a marine on a transport ship is not given a scouting objective to perform scouting patrols or a fire suppression objective to mortar a target while on the transport ship. In some implementations, the lower-level OE performs actions consistent with higher-level OEs in its encapsulation. In some implementations, one or more other lower-level OEs are encapsulated within the first OE. In some implementations, the second OE is encapsulated within one or more other higher-level OEs.

In some implementations, the system determines a set of OE encapsulations for each time period of the event. As such, an OE encapsulation may change over the course of the event such as OEs (layers) being stripped away or added. As one example, a particular battle encapsulation starts as transport ship->amphibious assault vehicle->company of marines->individual marine while in transport ($T_0$). Continuing with this example, the OE encapsulation changes to amphibious assault vehicle->company of marines->individual marine while approaching the beach ($T_1$). Continuing with this example, the OE encapsulation changes again to company of marines->individual marine while storming the beach ($T_2$). Continuing with this example, the OE encapsulation changes again when the marines may find and enter a vehicle after reaching the beach ($T_3$) which changes the encapsulation to vehicle->subset of company of marines->individual marine.

As shown in FIG. 6B, at time $T_1$, the OE encapsulation 685b includes the OE 684 encapsulated/nested within the OE 682. For example, at time $T_1$, after landing on a beach, the OE encapsulation 685b includes the OE 684 (e.g., the individual marine) encapsulated/nested within the OE 682 (e.g., the company of marines).

As shown in FIG. 6B, at time $T_2$, the OE encapsulation 685c includes the OE 684. For example, at time $T_2$, after landing on a beach and completing a mission, the OE encapsulation 685c includes the OE 684 (e.g., the individual marine) apparat from the OE 682.

As shown in FIG. 6B, at time $T_3$, the OE encapsulation 685d includes the OE 684 encapsulated/nested within the OE 686. For example, at time $T_3$, after landing on a beach and reaching a rendezvous point, the OE encapsulation 685d includes the OE 684 (e.g., the individual marine) encapsulated/nested within the OE 686 (e.g., an evacuation helicopter or truck).

Figure 6C:
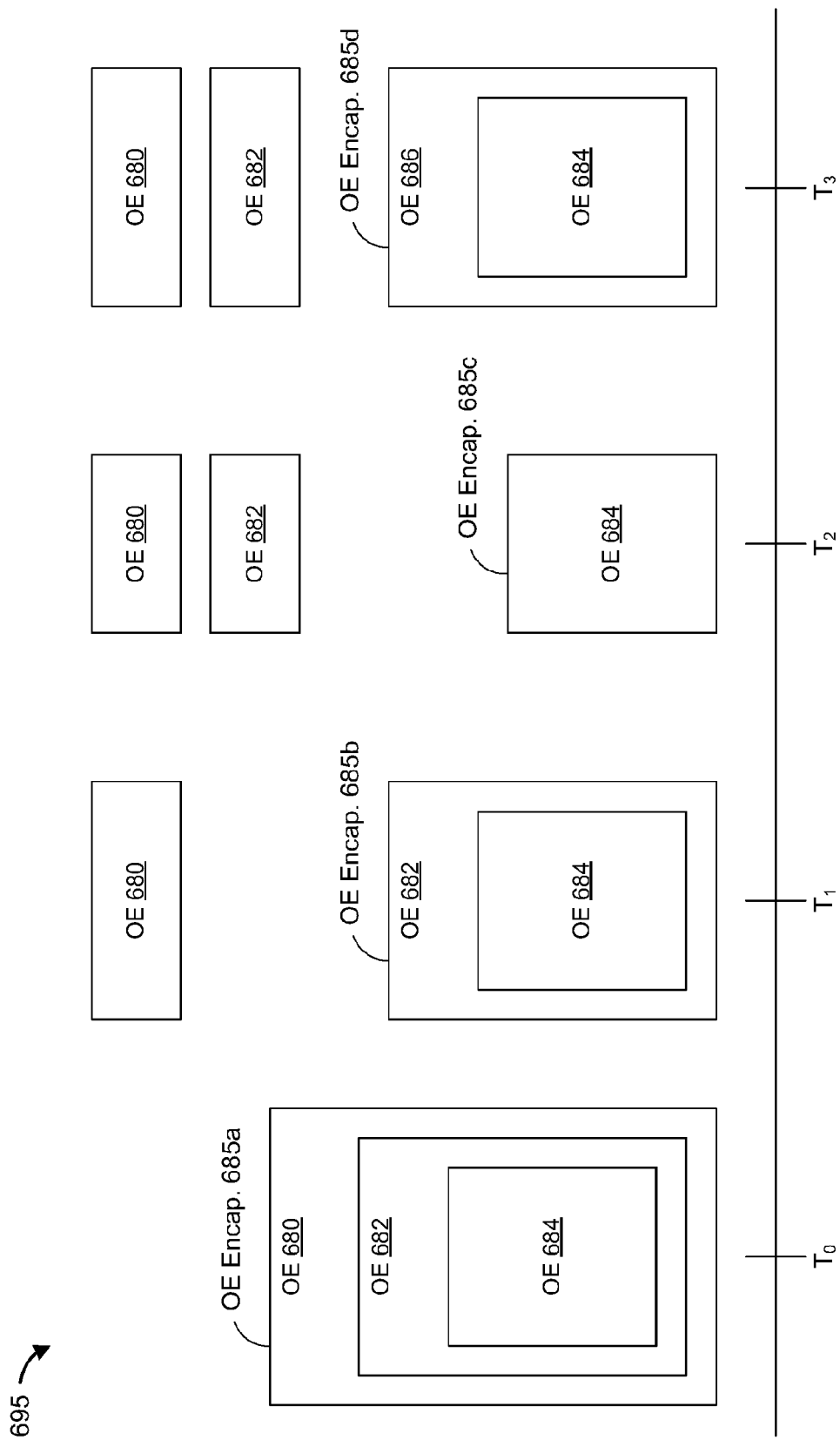

FIG. 6C is a block diagram of a timeline 695 associated with an objective-effectuator (OE) encapsulation in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, the timeline 695 is related to the timeline 675 in FIG. 6B. The time 695 illustrates the parallel functioning of the OEs even after the OE encapsulation changes over the time periods or temporal points $T_0$, $T_1$, $T_2$, and $T_3$. In other words, FIG. 6C illustrates the OEs 680 and 682 that are stripped away from the OE encapsulation 685a and 685b over time continuing to function in parallel with the OE 684.

Figure 7A:
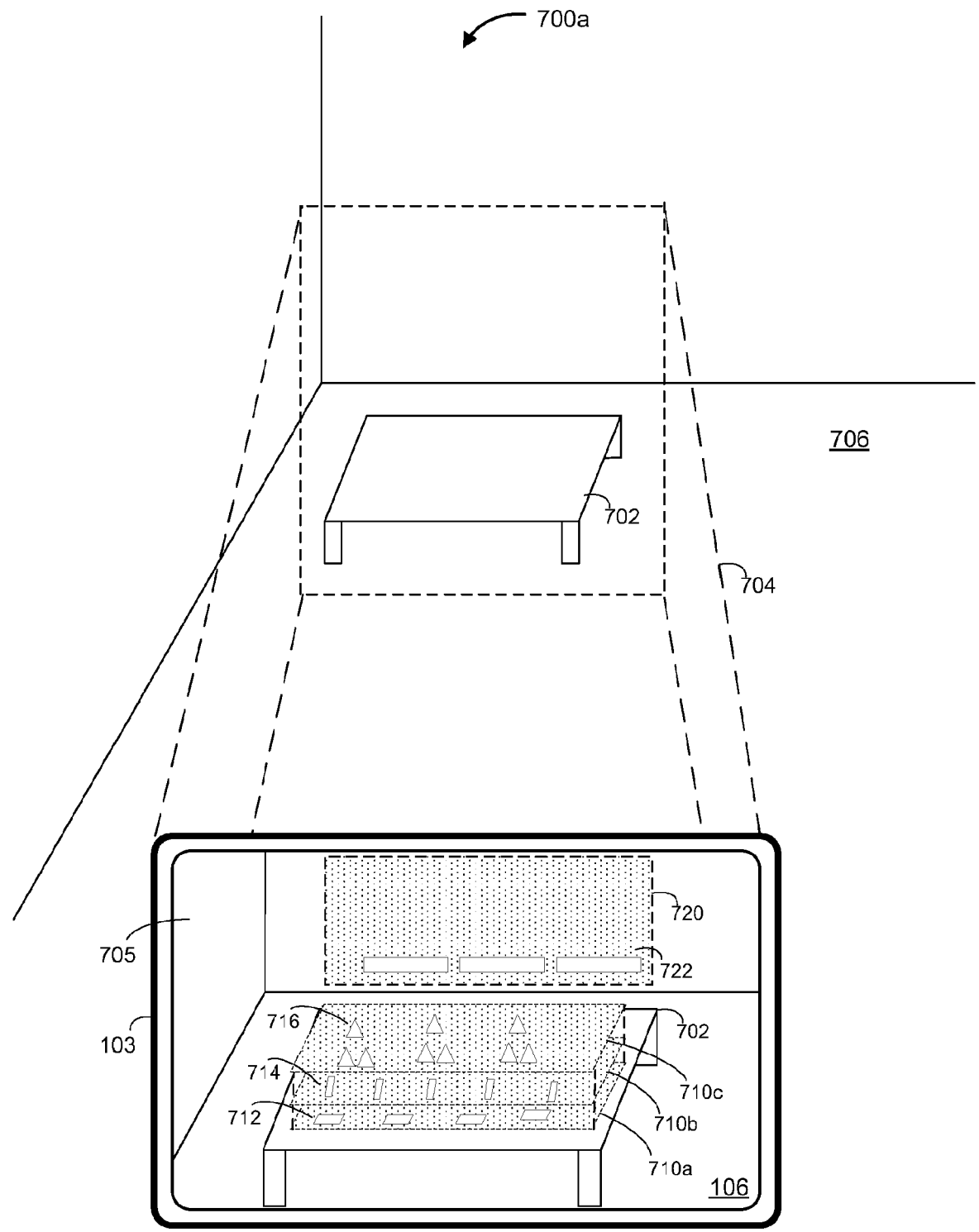
FIGS. 7A-7C illustrate example SR presentation scenarios in accordance with some implementations.
Figure 7B:
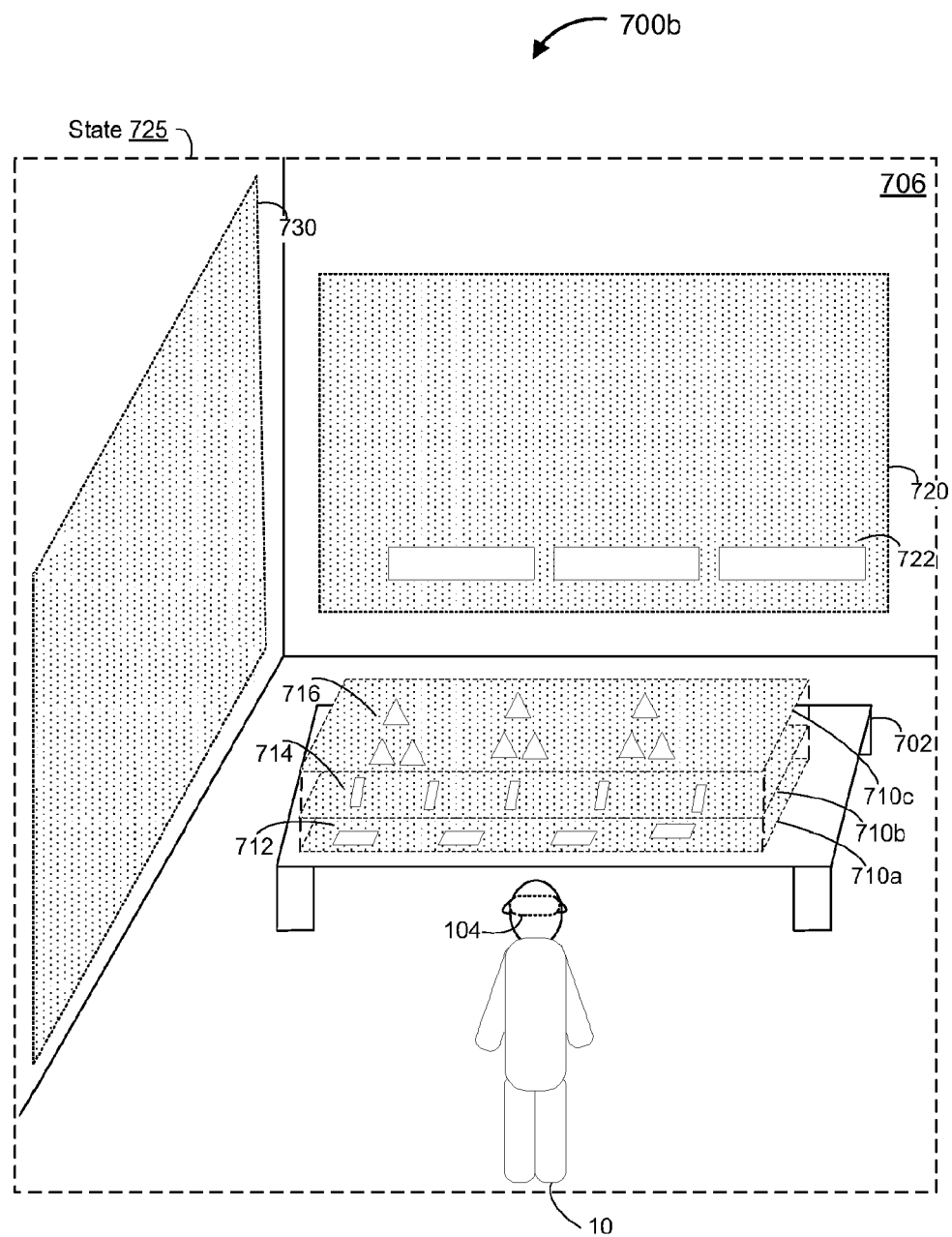
Figure 7C:
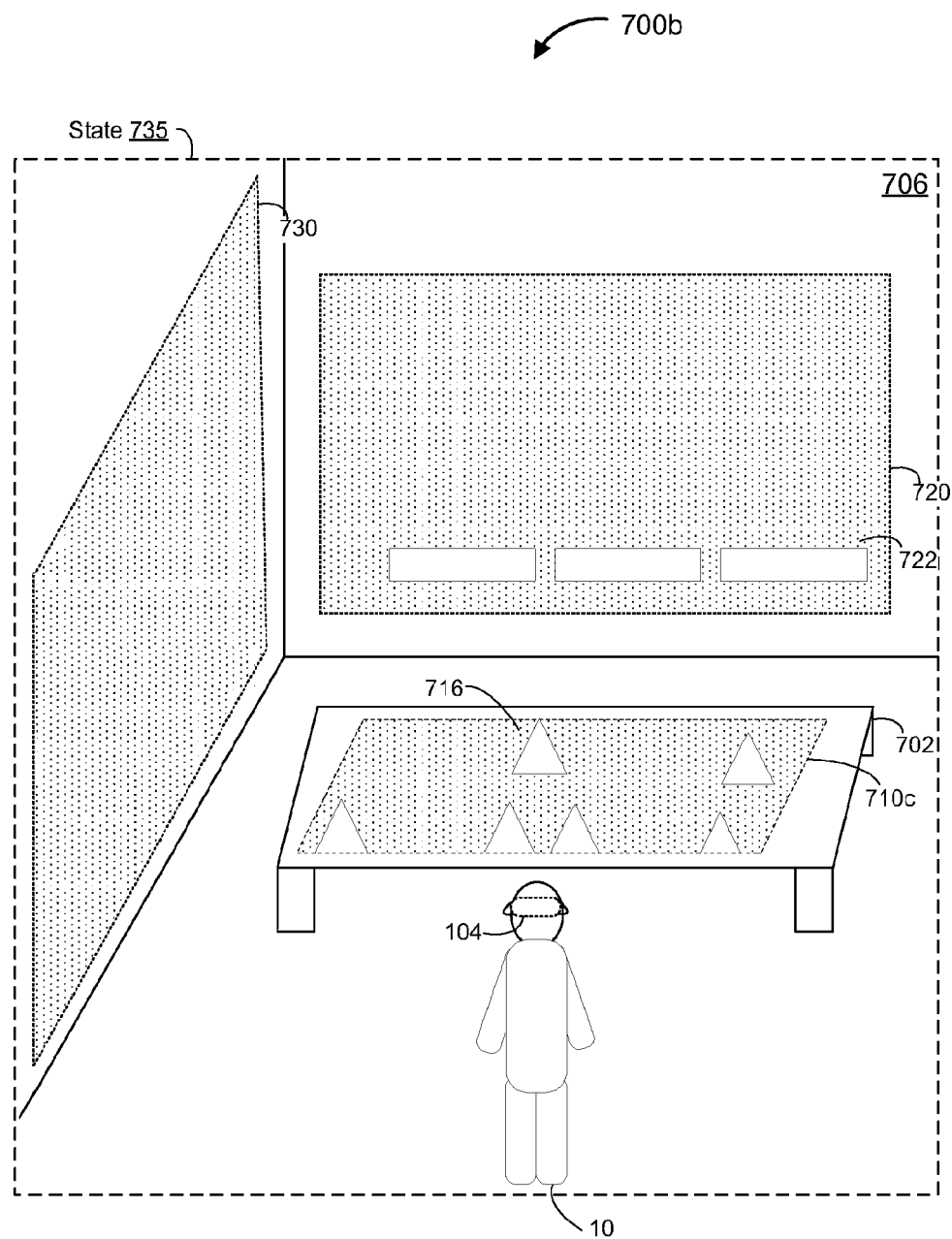

FIGS. 7A-7C illustrate example SR settings 700a and 700b in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

FIG. 7A illustrates an example SR setting 700a. As shown in FIG. 7A, the physical setting 706 includes a table 702. In this example, a portion of the physical setting 706 is within the field-of-view 704 of the electronic device 103, where the field-of-view 704 is associated with an external facing image sensor of the electronic device 103 (e.g., a tablet or mobile phone). In other words, the user is looking at the table 702 from a side or perspective orientation through the electronic device 103. As such, the portion of the physical setting 706, including the table 702, is displayed on the display 705 of the electronic device 103 (e.g., a live video stream or video pass-through of the physical setting 706). As shown in FIG. 7A, the electronic device 103 displays an SR setting 106 on the display 705 that includes SR content superimposed on or composited with the table 702 and the wall.

As shown in FIG. 7A, for example, the SR content (e.g., associated with a particular battle) overlaid or superimposed on the table 702 includes a first SR content layer 710a (e.g., an underwater layer) with SR content elements 712 (e.g., sunken ships, sunken amphibious landing craft, underwater mines, and/or the like), a second AR content layer 710b (e.g., a water surface layer) with SR content elements 714 (e.g., amphibious landing craft with platoons of infantrymen or marines, transport ships, and/or the like), and a third SR content layer 710c (e.g., an aerial layer) with SR content elements 716 (e.g., aircraft, dirigibles, shells, and/or the like). As shown in FIG. 7A, for example, the SR content 720 overlaid on the wall includes SR content elements 722 (e.g., defensive position, stationary guns, and/or the like on land). One of ordinary skill in the art will appreciate that the number, structure, dimensions, and placement of the SR content layers and associated SR content elements in FIG. 7A is arbitrary and may be changed in various other implementations.

FIGS. 7B and 7C illustrate an example SR setting 700b. As shown in FIGS. 7B and 7C, as one example, the user 10 wears the HMD 104 his/her head (e.g., AR-enabled glasses) with optical see-through of the physical setting 706 (e.g., the user's living room). As shown in FIGS. 7B and 7C, as another example, the user 10 wears the HMD 104 on his/her head (e.g., an SR-enabled headset) with video pass-through of the physical setting 706 (e.g., the user's living room).

As shown in FIG. 7B, in state 725 (e.g., associated with time period $T_1$), the HMD 104 superimposes or overlays SR content on the table 702 and the walls of the physical setting 706. In this example, with reference to state 725, the SR content (e.g., associated with a particular battle) overlaid on the table 702 includes a first SR content layer 710a (e.g., an underwater layer) with SR content elements 712 (e.g., sunken ships, sunken amphibious landing craft, underwater mines, and/or the like), a second SR content layer 710b (e.g., a water surface layer) with SR content elements 714 (e.g., amphibious landing craft with platoons of infantrymen or marines, transport ships, and/or the like), and a third SR content layer 710c (e.g., an aerial layer) with SR content elements 716 (e.g., aircraft, dirigibles, shells, and/or the like). As shown in FIG. 7B, with reference to state 725, the SR content elements 720 overlaid on the front wall includes SR content elements 722 (e.g., defensive position, stationary guns, and/or the like on land), and the SR content elements 730 overlaid on the side wall includes peripheral or environment details. One of ordinary skill in the art will appreciate that the number, structure, dimensions, and placement of the SR content layers and associated SR content elements in FIG. 7B is arbitrary and may be changed in various other implementations.

As shown in FIG. 7B, state 725 corresponds to a first SR view of the event such as an omniscient third-person view of the overall event (e.g., a particular battle). In response to receiving an input from the user 10 (e.g., a voice command, gesture, or the like) selecting the third AR content layer 710c (e.g., an aerial layer), the HMD 104 presents a second SR view of the event associated with the third SR content layer 710c (e.g., an aerial layer).

As shown in FIG. 7C, in state 735 (e.g., associated with time period $T_2$), the HMD 104 updates the SR content superimposed or overlaid on the table 702 in response to the selectin of the third AR content layer 710c. As shown in FIG. 7C, in state 735, the HMD 104 superimposes or overlays SR content on the table 702 that corresponds to the third SR content layer 710c. In this example, with reference to state 735, the SR content (e.g., associated with a particular battle) overlaid on the table 702 includes the third SR content layer 710c (e.g., an aerial layer) with SR content elements 716 (e.g., aircraft, dirigibles, shells, and/or the like). For example, in FIG. 7C, the third SR content layer 710c corresponds to a center of gravity of a squadron of aircraft on approach to attack the defensive positions on within a battle site. As another example, in state 735, the user 10 may be presented the point-of-view of a particular pilot among the squadron of aircraft on approach to attack the defensive positions on a battle site (not shown).

Figure 8A:
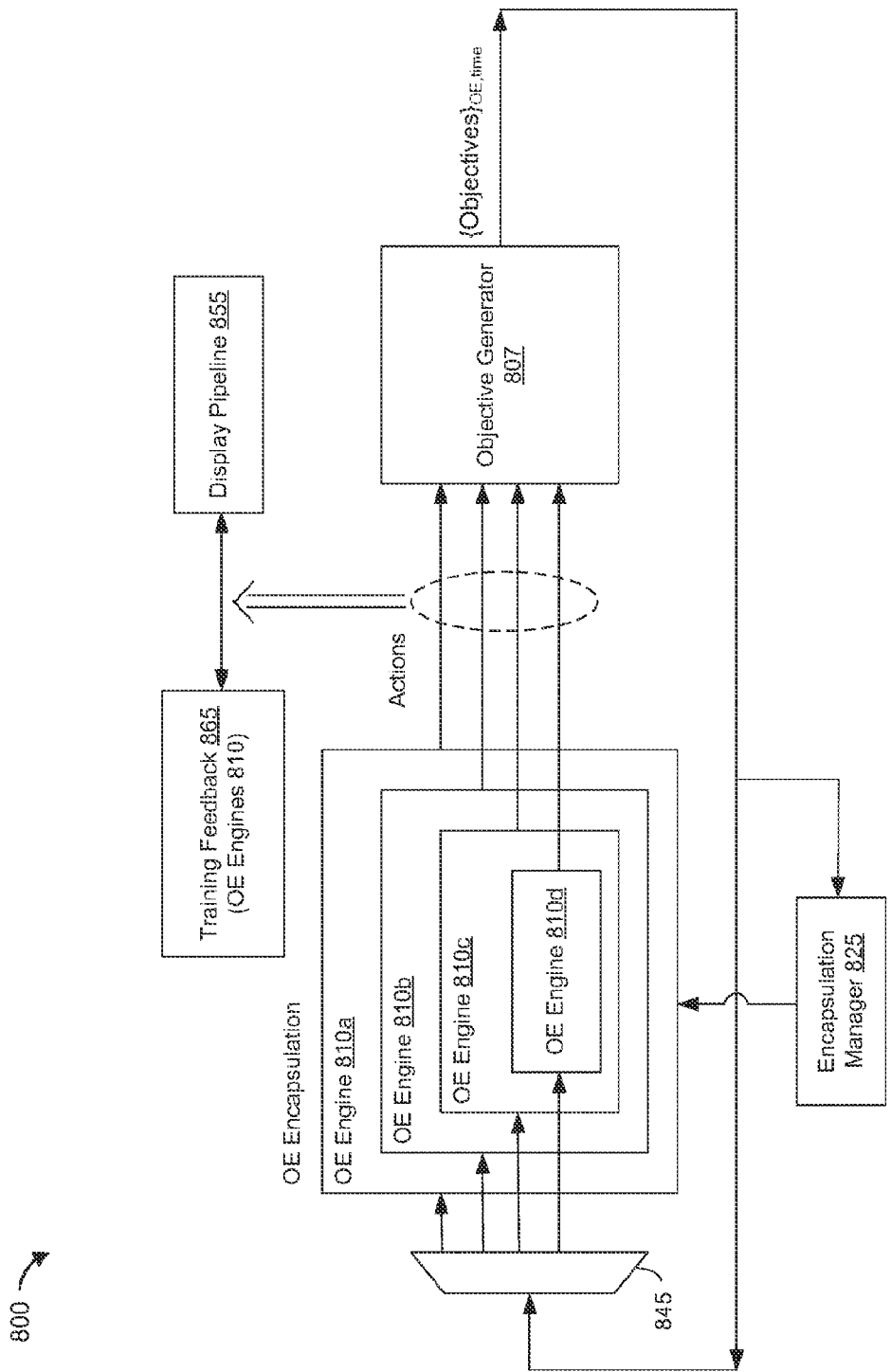
FIGS. 8A-8C are block diagrams of emergent content architectures in accordance with some implementations.

FIG. 8A is a block diagram of an emergent content architecture 800 in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations, an objective-effectuator (OE) encapsulation of related (e.g., encapsulated/nested) OE engines 810a, 810b, 810c, and 810d (sometimes collectively referred to herein as the OE engines 810) (e.g., similar to character engines 208a-e in FIG. 2) perform actions based on objectives derived from the objective generator 807.

As one example, the OE encapsulation includes a top-level OE engine 810a associated with a transport ship, a second-level OE engine 810b associated with an amphibious landing craft being transported by the transport ship, a third-level OE engine 810*c* associated a platoon of infantrymen or marine assigned to the amphibious landing craft, and a bottom-level OE engine 810*d* associated with a particular infantryman or marine. As such, the various OE engines within the OE encapsulation are related in some manner as they correspond to connected nodes within a conditionally dependent SR content threads associated with the event (e.g., as described with reference to the story nodes in FIG. 6A). According to some implementations, the emergent content architecture 800 is structured to produce concurrent actions for the various OE engines within the OE encapsulation for consistent content. In various implementations, one of ordinary skill in the art will appreciate that emergent content architecture 800 may include an arbitrary number of OE encapsulations. In some implementations, a same OE engine may be shared between two or more OE encapsulations due to the related nature of OEs to OE encapsulations.

According to some implementations, the objective generator 807 (e.g., a neural network or other AI construct) produces objectives for each OE per time period based on a bank of predetermined objectives, previous objectives, source assets, and/or other information (e.g., similar to the emergent content engine 250 in FIG. 2). According to some implementations, the encapsulation manager 825 determines the OE encapsulation (e.g., the nesting or layering of related OEs). For example, the encapsulation manager 825 determines the OE encapsulation based on the connections between the story nodes within conditionally dependent SR content threads associated with the event. In some implementations, the encapsulation manager 825 modifies the OE encapsulation over time (e.g., adding or removing layers of OEs) based on the objectives, source assets, and/or other information.

In some implementations, the demultiplexer 845 routes the objectives on a per OE basis to their respective OE engines 810. In some implementations, the OE engines 810 perform actions based on their objectives. According to some implementations, the actions for a time period are captured and provided to a display pipeline 855 for rendering and display in order to present the SR content associated with the event to a user (e.g., an SR reconstruction or simulation of a battle or other event based on the source assets then emergent content). According to some implementations, the actions for a time period are captured and provided to the OE engines 810 as training feedback 865. According to some implementations, the actions are provided to the objective generator 807 which in turn produces updated objective for each OE per time period (e.g., as described above with reference to the emergent content engine 250 in FIG. 2).

Figure 8B:
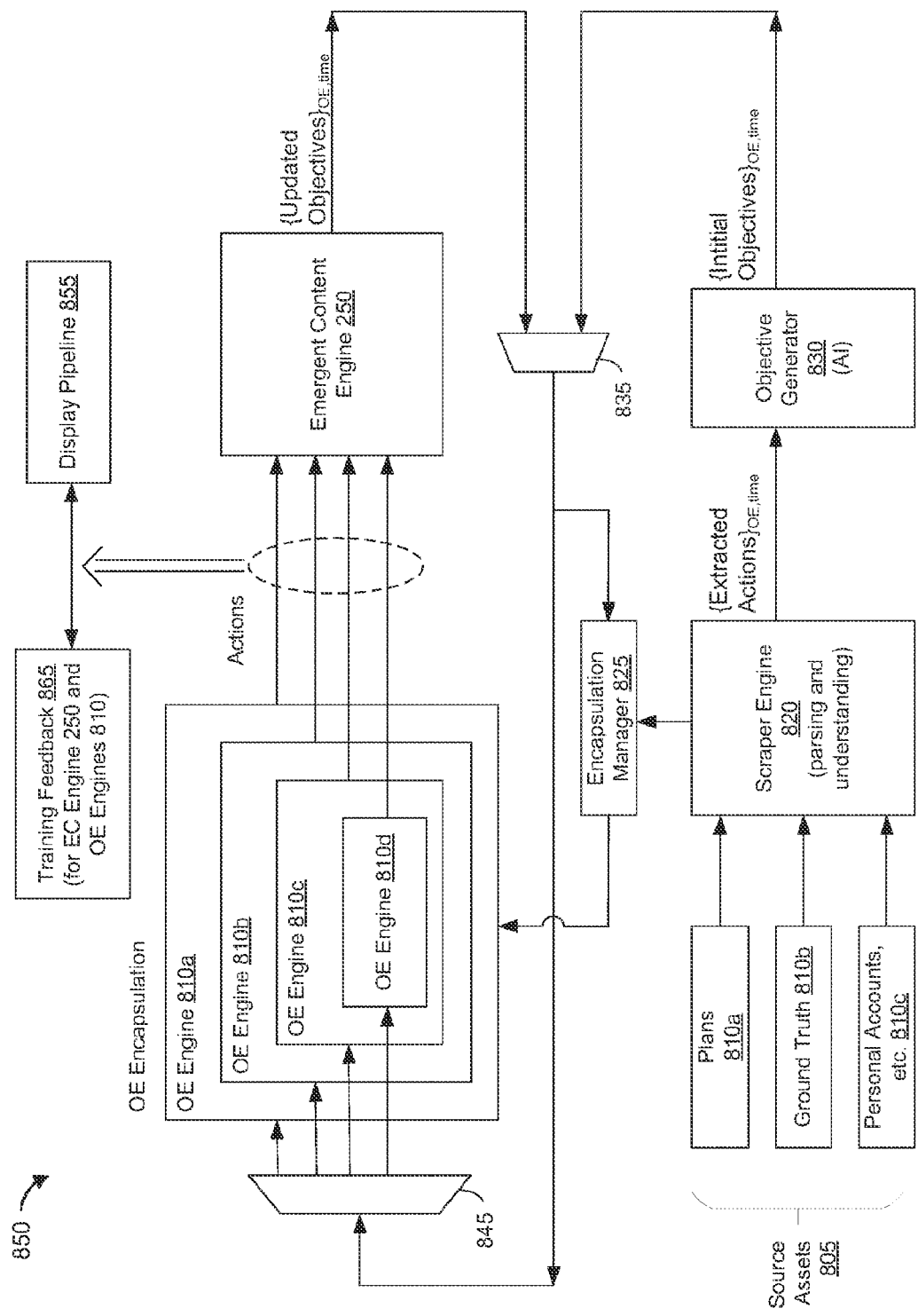

FIG. 8B is a block diagram of an emergent content architecture 850 in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations, an objective-effectuator (OE) encapsulation of related (e.g., encapsulated/nested) OE engines 810*a*, 810*b*, 810*c*, and 810*d* (sometimes collectively referred to herein as the OE engines 810) (e.g., similar to character engines 208*a-e* in FIG. 2) perform actions based on initial objectives derived from source assets 805 at time $T_0$ and based on updated objectives derived from the emergent content engine 250 at times $T_1$ and on.

According to some implementations, the encapsulation manager 825 determines the OE encapsulation (e.g., the nesting or layering of related OEs). For example, the encapsulation manager 825 determines the OE encapsulation based on the connections between the story nodes within a conditionally dependent SR content threads associated with the event. In some implementations, the encapsulation manager 825 modifies the OE encapsulation over time (e.g., adding or removing layers of OEs) based on the objectives, source assets, and/or other information.

As one example, the OE encapsulation includes a top-level OE engine 810*a* associated with a transport ship, a second-level OE engine 810*b* associated with an amphibious landing craft being transported by the transport ship, a third-level OE engine 810*c* associated a platoon of infantrymen or marine assigned to the amphibious landing craft, and a bottom-level OE engine 810*d* associated with a particular infantryman or marine. As such, the various OE engines within the OE encapsulation are related in some manner as they correspond to connected nodes within a conditionally dependent SR content threads associated with the event (e.g., as described with reference to the story nodes in FIG. 6A). According to some implementations, the emergent content architecture 850 is structured to produce concurrent actions for the various OE engines within the OE encapsulation for consistent emergent content. In various implementations, one of ordinary skill in the art will appreciate that emergent content architecture 850 may include an arbitrary number of OE encapsulations. In some implementations, a same OE engine may be shared between two or more OE encapsulations due to the related nature of OEs to OE encapsulations.

According to some implementations, the initial objectives are produced by the operations of a scraper engine 820 and an objective generator 830 based on source assets 805 associated with an event (e.g., plans 810*a*, ground truth 810*b*, and personal accounts or the like 810*c* for the event). In some implementations, the scraper engine 820 performs parsing and understanding operations on the source assets 805 in order to produce extracted actions for each OE (e.g., characters identified in the source assets 805) per time period. For example, in some implementations, the scraper engine 820 extracts the actions from the source assets 805. Thereafter, in some implementations, the objective generator 830 (e.g., a neural network or other AI construct) produces initial objectives for each OE per time period.

According to some implementations, a multiplexer 835 enables one of the initial objectives or the updated objectives as inputs to the OE encapsulation. In some implementations, the demultiplexer 845 routes the objectives on a per OE basis to their respective OE engines 810. In some implementations, the OE engines 810 perform actions based on their objectives. According to some implementations, the actions for a time period are captured and provided to a display pipeline 855 for rendering and display in order to present the SR content associated with the event to a user (e.g., an SR reconstruction or simulation of a battle or other event based on the source assets then emergent content). According to some implementations, the actions for a time period are captured and provided to the emergent content engine 250 and the OE engines 810 as training feedback 865. According to some implementations, the actions are provided to the emergent content engine 250 which in turn produces updated objective for each OE per time period (e.g., as described above with reference to the emergent content engine 250 in FIG. 2).

Figure 8C:
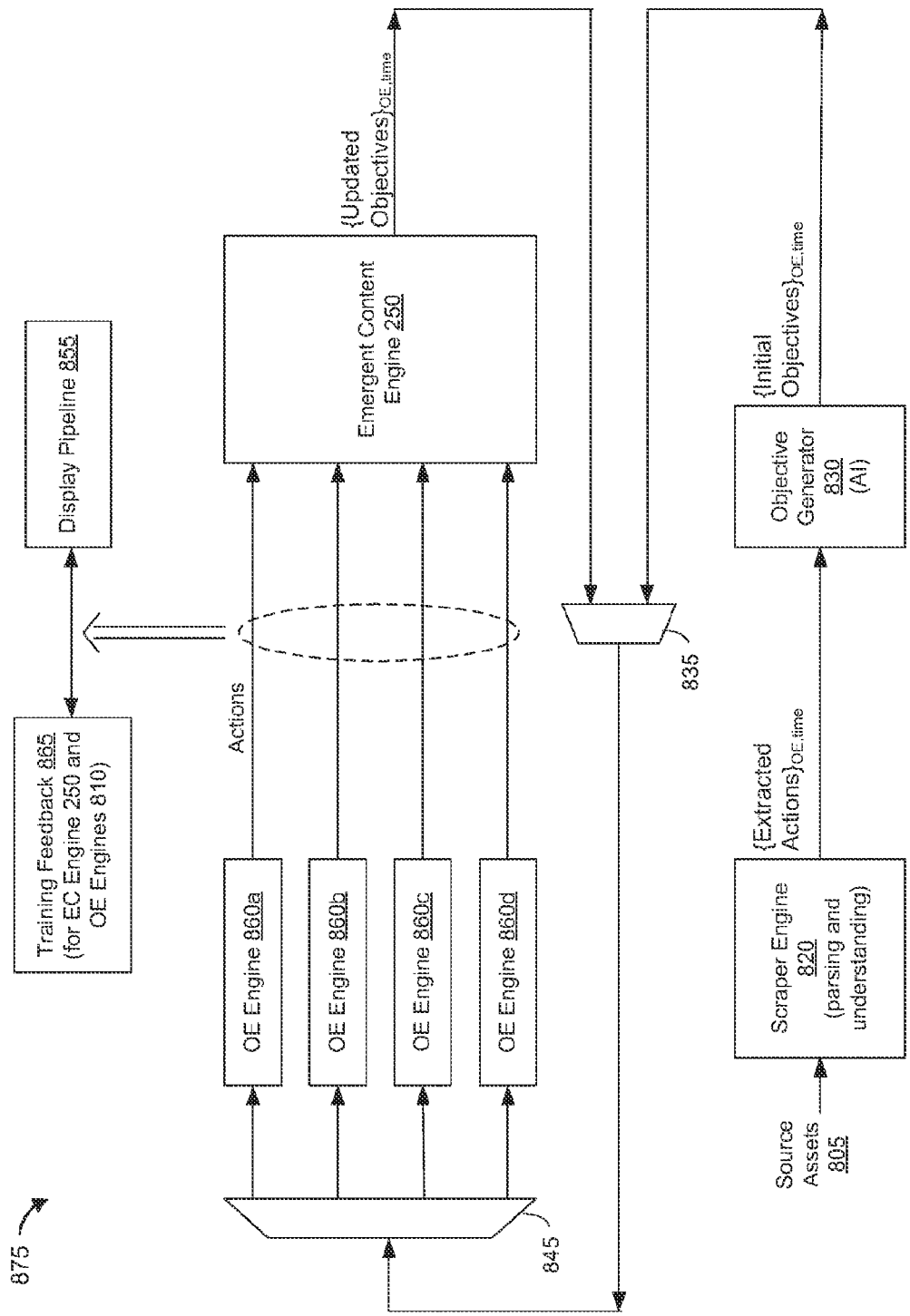

FIG. 8C is a block diagram of an emergent content architecture 875 in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations, OE engines 860a, 860b, 860c, and 860d (sometimes collectively referred to herein as the OE engines 860) (e.g., similar to character engines 208a-e in FIG. 2) perform actions based on initial objectives derived from source assets 805 at time $T_0$ and based on updated objectives derived from the emergent content engine 250 at times $T_1$ and on.

According to some implementations, the initial objectives are produced by the operations of a scraper engine 820 and an objective generator 830 based on source assets 805 (e.g., a movie, TV episode, audio book, novel, magazine article, etc.). In some implementations, the scraper engine 820 performs parsing and understanding operations on the source assets 805 in order to produce extracted actions for each OE (e.g., characters identified in the source assets 805) per time period. For example, in some implementations, the scraper engine 820 extracts the actions from the source assets 805. Thereafter, in some implementations, the objective generator 830 (e.g., a neural network or other AI construct) produces initial objectives for each OE per time period.

According to some implementations, the multiplexer 835 enables one of the initial objectives or the updated objectives as inputs to the OE engines 860. In some implementations, the demultiplexer 845 routes the objectives on a per OE basis to their respective OE engines 860. In some implementations, the OE engines 860 perform actions based on their objectives. According to some implementations, the actions for a time period are captured and provided to a display pipeline 855 for rendering and display in order to present the SR content associated with the event to a user (e.g., an SR reconstruction or simulation of a battle or other event based on the source assets then emergent content). According to some implementations, the actions for a time period are captured and provided to the emergent content engine 250 and the OE engines 860 as training feedback 865. According to some implementations, the actions are provided to the emergent content engine 250 which in turn produces updated objective for each OE per time period (e.g., as described above with reference to the emergent content engine 250 in FIG. 2).

Figure 9:
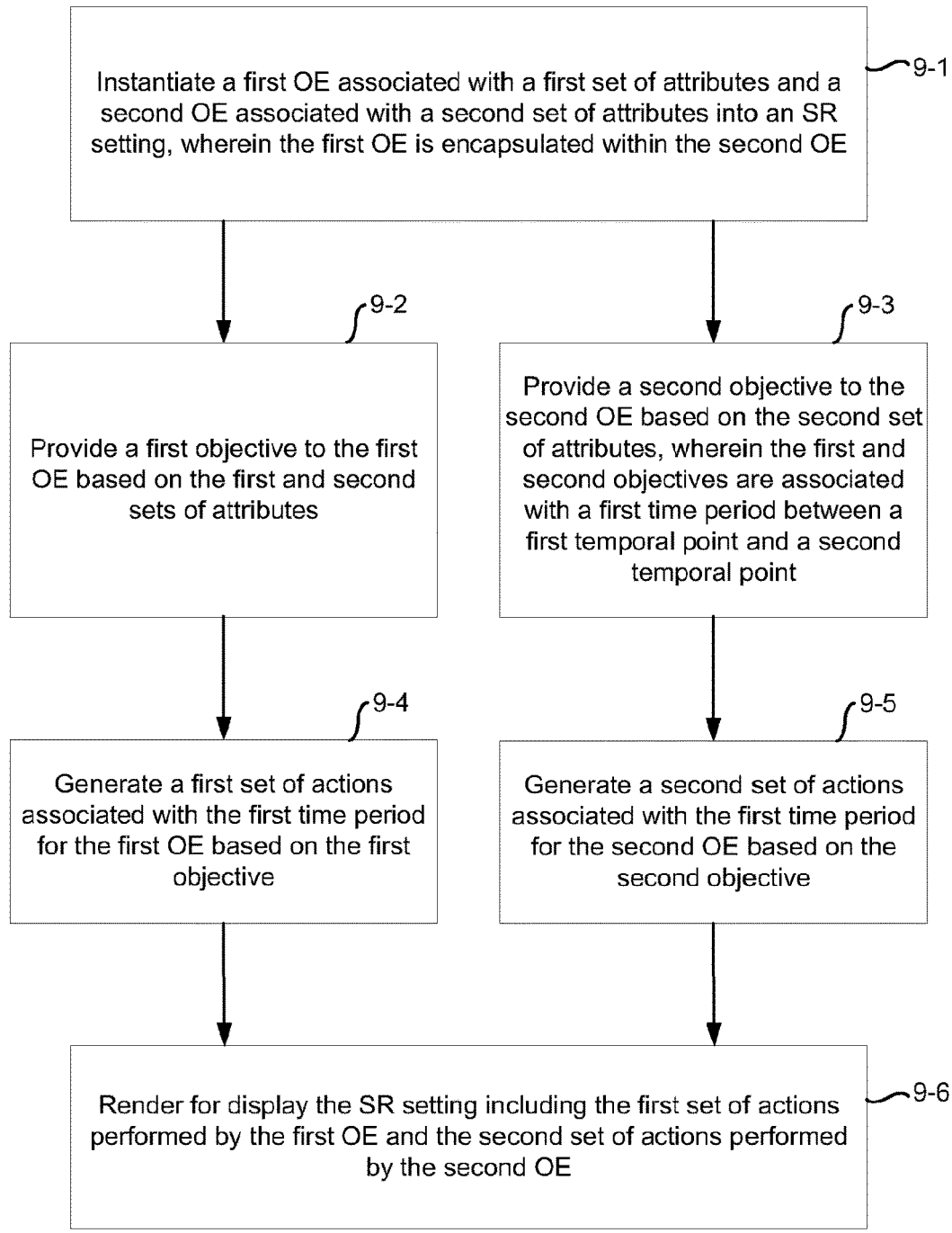
FIG. 9 is a flowchart representation of a method of instantiating an OE encapsulation within an SR setting in accordance with some implementations.

FIG. 9 is a flowchart representation of a method 900 of instantiating an objective-effectuator (OE) encapsulation within an SR setting in accordance with some implementations. In various implementations, the method 900 is performed by a device with a non-transitory memory and one or more processors coupled with the non-transitory memory (e.g., the controller 102, the electronic device 103 shown in FIG. 1A, and/or the HMD 104 shown in FIG. 1B). In some implementations, the method 900 is performed by processing logic, including hardware, firmware, software, or a combination thereof. In some implementations, the method 900 is performed by a processor executing code stored in a non-transitory computer-readable medium (e.g., a memory).

The method 900, for example, generates objectives for OEs in an OE encapsulation, which result in related plots in an SR setting that are consistent with the context of the encapsulation (e.g., while on the transport ship, a marine performs actions consistent with the transport ship context). As one example, the OE encapsulation associated with an event (e.g., a particular battle) corresponds to navy->transport ship->amphibious assault vehicle->company of marines->individual marine.

As represented by block 9-1, the method 900 includes instantiating a first OE associated with a first set of attributes (e.g., visual rendering attributes, possible actions, contextual information, etc.) and a second OE associated with a second set of attributes into an SR setting, wherein the first OE is encapsulated within the second OE. In some implementations, when the first OE is encapsulated within the second OE, the first OE is associated with the second OE. In some implementations, when the first OE is encapsulated within the second OE, the first OE is correlated with the second OE. In some implementations, when the first OE is encapsulated within the second OE, the first OE is related to the second OE. In some implementations, when the first OE is encapsulated within the second OE, the first OE is dependent on the second OE. In other words, the first OE is provided objectives and performs actions that are consistent with the context and attributes of the second OE because the first OE is encapsulated within the second OE. In some implementations, the lower-level OE performs actions consistent with higher-level OEs in which it is encapsulated. In some implementations, the one or more other lower-level OEs are encapsulated within the first OE. In some implementations, the second OE is encapsulated within one or more other higher-level OEs.

In some implementations, the attributes are extracted from source material/assets associated with the event including, for example, plans for the event such as battle plans, ground truth for the event such as the course and outcomes of the battle, historical accounts or memoirs, screenplays, scripts, text or audio books, movies, video games, novels, etc. In some implementations, the system determines a set of OE encapsulations for each time period (e.g., as shown in FIGS. 6B and 6C). As such, an OE encapsulation may change over the course of the event such as OEs (layers) being stripped away or added. As one example, a particular battle encapsulation starts as transport ship->amphibious assault vehicle->company of marines->individual marine while in transport ($T_0$). Continuing with this example, the OE encapsulation changes to amphibious assault vehicle->company of marines->individual marine while approaching the beach ($T_1$). Continuing with this example, the OE encapsulation changes again to company of marines->individual marine while storming the beach ($T_2$). Continuing with this example, the OE encapsulation changes again when the marines may find and enter a vehicle after reaching the beach ($T_3$) which changes the encapsulation to vehicle->subset of company of marines->individual marine.

As represented by block 9-2, the method 900 includes providing a first objective to the first OE based on the first and second sets of attributes. In some implementations, the first OE is provided an objective based on the context of the second OE within which it is encapsulated and, in turn, the first OE performs actions that are consistent with that context. For example, a marine on a transport ship is not given a scouting objective to perform scouting patrols or a fire suppression objective to mortar a target while on the transport ship.

As represented by block 9-3, the method 900 includes providing a second objective to the second OE based on the second set of attributes, wherein the first and second objectives are associated with a first time period between a first temporal point and a second temporal point (e.g., the objectives are valid or active for the particular time period). In some implementations, the objectives correspond to initial objectives synthesized from the source assets. In some implementations, the objectives are updated every time period by the emergent content engine. In some implementations, the OE encapsulations are updated every time period by an encapsulation manager such as adding or removing OEs (layers) from an encapsulation. In one example, the first and second temporal points correspond to start and end times for a scene within source content. As another example, the first and second temporal points correspond to natural break points in an instruction set or the like. As yet another example, the first and second temporal points correspond to start and end states for an event (e.g., the state of troops before and after a battle). Thus, according to some implementations, the first and second temporal points provide book ends or guide posts for the objectives.

In some implementations, the method 900 includes synthesizing the first and second objectives based on source assets/materials (e.g., a movie, book, historical account associated with an event or the like). For example, the source assets correspond to plans for the event such as battle plans, ground truth for the event such as the course and outcomes of the battle, historical accounts or memoirs, screenplays, scripts, text or audio books, movies, video games, novels, etc. For example, the source assets also include 3D models of terrain, infrastructure, vehicles, humanoids, animals, etc. associated with the story or event.

In some implementations, the method 900 includes extracting a set of actions associated with an event from the source assets, and wherein the first and second objectives are derived from the set of actions (e.g., the set of actions include basic plot points associated with a book, movie, event, or the like such as its start and end situations). In some implementations, the first and second objectives are consistent with the set of actions. For example, if the predefined set of actions does not include killing, then the objective cannot be to kill. For example, if the set of actions includes at least start and end points (e.g., book-ends) for the event, the objective is derived to get a character from the start to the end point. For example, characters cannot perform actions "outside" of intellectual property (IP) or digital rights management (DRM)-limited bounds.

In some implementations, the first and second objectives are generated by utilizing a neural network. For example, the neural network generates the first and second objectives based on a set of neural network parameters (e.g., weights). For example, the neural network parameters are determined by a reward function. In some implementations, the first and second objectives are provided to a training module that adjusts parameters of a neural network that generates the objectives. For example, the training module includes a reward function that assigns positive rewards to desirable actions and negative rewards to undesirable actions. For example, the training module utilizes reinforcement learning to configure the neural network. For example, the training module utilizes fan-created content (e.g., blog posts), canon video, novels, books, comics and/or video games to train the neural network.

As represented by block 9-4, the method 900 includes generating a first set of actions associated with the first time period for the first OE based on the first objective. As represented by block 9-5, the method 900 includes generating a second set of actions associated with the first time period for the second OE based on the second objective. For example, with reference to FIG. 8A, the OE engines 810 perform actions based on objectives from the objective generator 807.

As represented by block 9-6, the method 900 includes rendering for display the SR setting including the first set of actions performed by the first OE and the second set of actions performed by the second OE. In some implementations, the SR setting is associated with an event. For example, the event corresponds to an athletic event, a concert, a battle, or another large-scale occurrence. For example, with reference to FIG. 8A, the display pipeline 855 renders the actions performed by the OEs for the first time period in order to present the SR content to a user.

In some implementations, the method 900 includes obtaining contextual information characterizing the SR setting. For example, the contextual information includes all OEs and OE encapsulations instantiated within the SR setting. For example, the contextual information includes user-specified scene/environment info. For example, the contextual information includes instantiated characters and equipment assets. For example, the contextual information includes identities of other characters that are to be instantiated. For example, the contextual information includes mesh maps for objects present in the user's environment (e.g., a desk).

In some implementations, the method 900 includes setting virtual environmental conditions for the SR setting based on the source assets. In some implementations, the virtual environment conditions include one or more of terrain conditions, weather conditions, lighting conditions and environment sounds. In some implementations, the method 900 includes changing the terrain and/or environmental conditions based on user inputs to test different simulations of the SR setting. For example, the terrain and/or weather associated with an event may be changed from its historical parameters to see how the outcome of the event may have changed with the changed terrain and/or weather (e.g., simulated winter weather in place of summer weather for the historical event, or simulated flat terrain replacing sloped rugged terrain for the historical event).

In some implementations, the method 900 includes receiving user selection of a specific OE and, in response, displaying SR content associated with the actions performed by the specific OE. For example, the user is able to "look through the eyes" of the selected OE and optionally control at least some aspects of the selected OE such as its movements.

In some implementations, the method 900 includes updating the objective for first OE for a next time period based on the first and second sets of attributes and also attributes of a new OE. For example, a third OE layer is added to the OE encapsulation, which further constrains the actions and objectives for the first OE. In some implementations, the new layer is a high-level layer than the first OE which is higher or equal to the second OE. For example, with reference to FIG. 8A, the encapsulation manager 825 updates the OE encapsulation by adding an additional OE engine within the OE encapsulation.

In some implementations, the method 900 includes updating the objective for first OE for a next time period to be a function of the first set of attributes. For example, the second OE layer is removed, opening new actions and objectives for the first OE. For example, with reference to FIG. 8A, the encapsulation manager 825 updates the OE encapsulation by removing one of the OE engines 810 within the OE encapsulation.

In some implementations, the method 900 includes adding/removing OEs to test different simulations within the SR setting. For example, if the transport ship typically has N amphibious landing craft, run a simulation within N−1 or N+1 amphibious landing craft to see how a battle's macro or micro outcome may change. For example, remove entire OE encapsulations and/or individual OEs within the SR setting. In some implementations, one of the OEs performs actions inconsistent with its objective when a predetermined criterion is satisfied (e.g., a morale criterion, self-preservation criterion, etc.). For example, a solider forgoes performing actions consistent with his/her objective and instead deserts his/her post if the predetermined criterion is satisfied.

In some implementations, the method 900 includes instantiating a second OE encapsulation including a third OE and a fourth OE. For example, at least one of the third or fourth OEs is included in both the first and second OE encapsulations.

Figure 10:
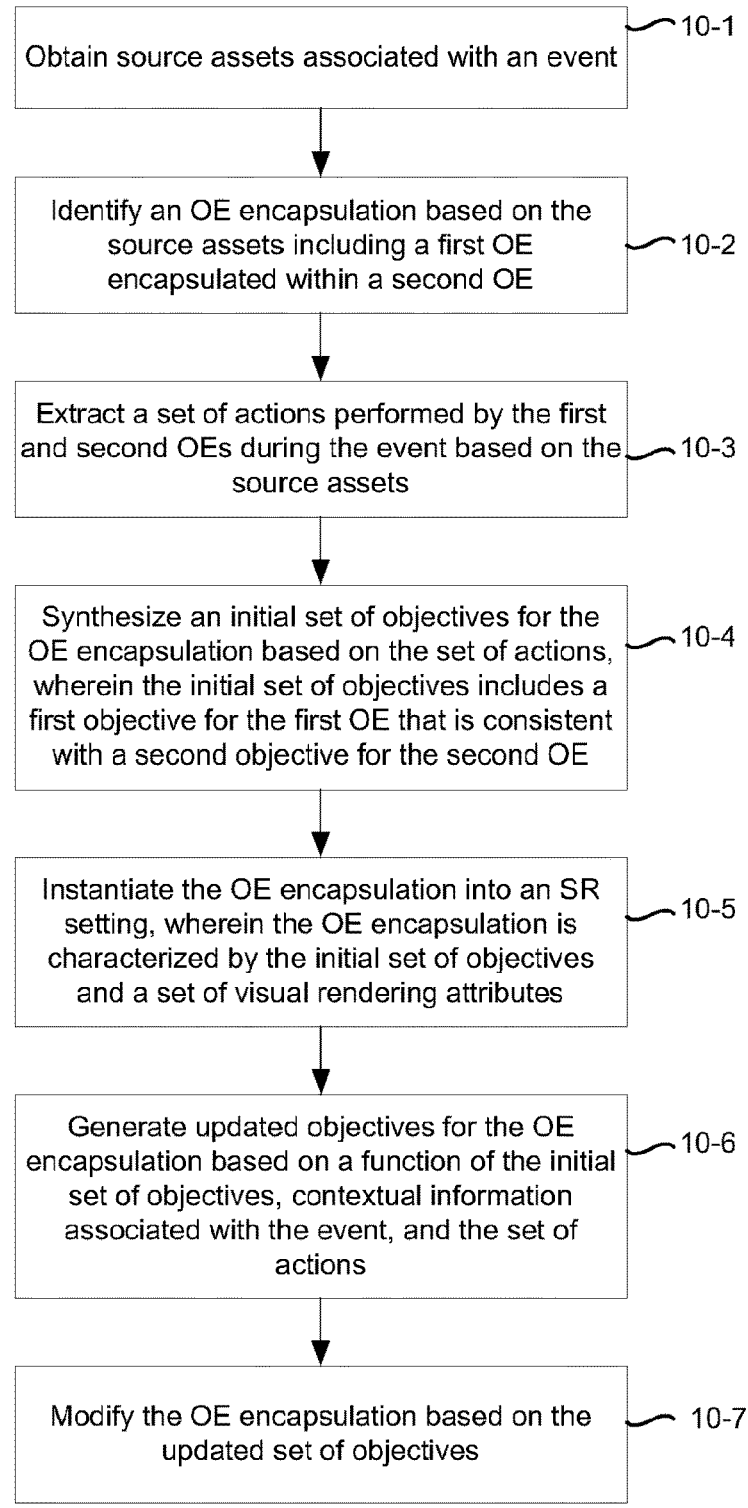
FIG. 10 is a flowchart representation of a method of initializing and generating content for an OE encapsulation within an SR setting in accordance with some implementations.

FIG. 10 is a flowchart representation of a method 1000 of initializing and generating content for an objective-effectuator (OE) encapsulation within SR setting in accordance with some implementations. In various implementations, the method 1000 is performed by a device with a non-transitory memory and one or more processors coupled with the non-transitory memory (e.g., the controller 102, the electronic device 103 shown in FIG. 1A, and/or the HMD 104 shown in FIG. 1B). In some implementations, the method 1000 is performed by processing logic, including hardware, firmware, software, or a combination thereof. In some implementations, the method 1000 is performed by a processor executing code stored in a non-transitory computer-readable medium (e.g., a memory).

As represented by block 10-1, the method 1000 includes obtaining source assets associated with an event. For example, the event corresponds to an athletic event, a concert, a battle, or another large-scale occurrence. For example, the source assets correspond to plans for the event such as battle plans, ground truth for the event such as the course and outcomes of the battle, historical accounts and books, movies, video games, novels, etc. For example, the source assets also include to 3D models of terrain, infrastructure, vehicles, humanoids, animals, etc. associated with the story or event.

As represented by block 10-2, the method 1000 includes identifying an OE encapsulation based on the source assets, the OE encapsulation including a first OE and a second OE. For example, the OE encapsulation corresponds to a set of related characters or entities such as a transport ship including N amphibious landing crafts each with M marines. In some implementations, the OEs corresponds to characters associated with the event such as humanoids, vehicles, androids, robots, animals, etc. For example, with reference to FIG. 8B, the encapsulation manager 825 determines the OE encapsulation including the OE engines 810 based on the source assets associated with the event.

As represented by block 10-3, the method 1000 includes extracting a set of actions performed by the first and second OEs during the event based on the source assets. For example, the set of actions correspond actions sequences for each OE derived from a screenplay or script for the event. In some implementations, the device synthesizes a screenplay for the event. In some implementations, the device receives a sequence of actions or a set of potential actions for the OEs from a character engine that generates the sequence of actions. In some implementations, the device receives a user input that indicates a sequence of actions. For example, the set of actions includes movement trajectory, operation of weapons or other related equipment, dialogue, etc. for the set of related characters. For example, with reference to FIG. 8B, the scraper engine 820 extracts a set of actions performed by the OEs during the event.

As represented by block 10-4, the method 1000 includes synthesizing an initial set of objectives for the OE encapsulation based on the set of actions extracted from source assets associated with an event, wherein the initial set of objectives includes a first objective for the first OE that is consistent with a second objective for the second OE. For example, with reference to FIG. 8B, the objective generator 830 synthesizes an initial set of objectives based on the extracted set of actions.

For example, the initial set of objectives are such that OEs within the OE encapsulation act in concert and do not conflict—cannot act to break from the related grouping. In some implementations, the initial set of objectives includes an objective for each OE within the OE encapsulation. In some implementations, the initial set of objectives is consistent with the set of actions. For example, if the predefined set of actions does not include killing, then the objective cannot be to kill. For example, if the set of actions includes at least start and end points (e.g., book-ends) for the event, the objective is derived to get a character from the start to the end point. For example, characters cannot perform actions "outside" of intellectual property (IP) or digital rights management (DRM)-limited bounds.

In some implementations, synthesizing the initial set of objectives includes utilizing a neural network. For example, a neural network generates the initial set of objectives based on a set of neural network parameters (e.g., weights). For example, the neural network parameters are determined by a reward function.

In some implementations, the initial set of objectives is provided to a training module that adjusts parameters of a neural network that generates the objective. For example, the training module includes a reward function that assigns positive rewards to desirable actions and negative rewards to undesirable actions. For example, the training module utilizes reinforcement learning to configure the neural network. For example, the training module utilizes fan-created content (e.g., blog posts), canon video, novels, books, comics and/or video games to train the neural network.

As represented by block 10-5, the method 1000 includes instantiating (e.g., at time $T_0$) the OE encapsulation into an SR setting (e.g., an SR setting), wherein the OE encapsulation is characterized by the initial set of objectives (e.g., synthesized from the source assets) and a set of visual rendering attributes. For example, with reference to FIG. 8B, at time $T_0$, the emergent content architecture 850 is initialized with initial objectives derived from source assets 805.

In some implementations, the method 1000 includes setting virtual environmental conditions for the SR setting based on the initial set of objectives. For example, the virtual environment conditions include one or more of terrain conditions, weather conditions, lighting conditions, environment sounds, and/or the like.

In some implementations, the method 1000 includes obtaining contextual information characterizing the SR setting. For example, the contextual information includes all OEs and OE encapsulations instantiated within the SR setting. For example, the contextual information includes user-specified scene/environment info. For example, the contextual information includes instantiated characters and equipment assets. For example, the contextual information includes identities of other characters that are to be instantiated. For example, the contextual information includes mesh maps for objects present in the user's environment (e.g., a desk).

As represented by block 10-6, the method 1000 includes generating updated objectives for the OE encapsulation based on a function of the initial set of objectives, contextual information associated with the event, and the set of actions. For example, the set of revised objectives cannot conflict due to their encapsulation. In some implementations, generating the updated set of objectives includes utilizing a neural network. For example, parameters of the neural network are provided by a reward function. For example, with reference to FIG. 8B, the emergent content engine 250 generates an updated set of objectives based at least in part on the previous actions performed by the OE engine 810.

As represented by block 10-7, the method 1000 includes modifying the OE encapsulation based on the updated set of objectives (e.g., at time $T_1$). For example, with reference to FIG. 8B, at time $T_1$ and on, the emergent content architecture 850 operates with updated objectives from the emergent content engine 250. In some implementations, the modified objective is provided to a character engine that generated the OE representation, and ultimately to a rendering and display pipeline in order to output SR content showing the OE performing the sequence of actions within the SR setting, and potentially in combination with one or more other OEs. For example, the OE performs actions that achieve the objective or improve the likelihood of achieving the objective.

Figure 11:
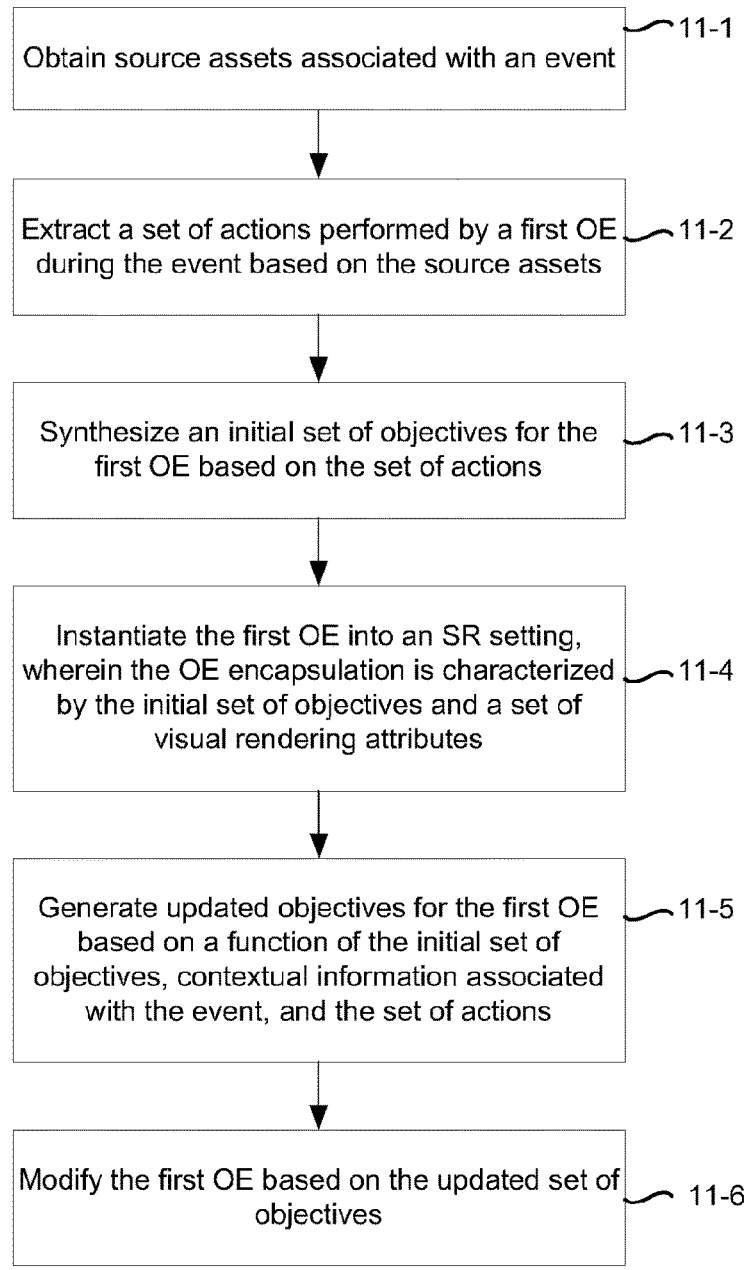
FIG. 11 is a flowchart representation of a method of initializing and generating content for an OE within an SR setting in accordance with some implementations.

FIG. 11 is a flowchart representation of a method 1100 of initializing and generating content for an objective-effectuator (OE) within SR setting in accordance with some implementations. In various implementations, the method 1100 is performed by a device with a non-transitory memory and one or more processors coupled with the non-transitory memory (e.g., the controller 102, the electronic device 103 shown in FIG. 1A, and/or the HMD 104 shown in FIG. 1B). In some implementations, the method 1100 is performed by processing logic, including hardware, firmware, software, or a combination thereof. In some implementations, the method 1100 is performed by a processor executing code stored in a non-transitory computer-readable medium (e.g., a memory).

As represented by block 11-1, the method 1100 includes obtaining source assets associated with an event. For example, the event corresponds to an athletic event, a concert, a battle, or another large-scale occurrence. For example, the source assets correspond to plans for the event such as battle plans, ground truth for the event such as the course and outcomes of the battle, historical accounts and books, movies, video games, novels, etc. For example, the source assets also include to 3D models of terrain, infrastructure, vehicles, humanoids, animals, etc. associated with the story or event.

As represented by block 11-2, the method 1100 includes extracting a set of actions performed by the first OE during the event based on the source assets. For example, the set of actions correspond actions sequences for each OE derived from a screenplay or script for the event. In some implementations, the device synthesizes a screenplay for the event. In some implementations, the device receives a sequence of actions or a set of potential actions for the OEs from a character engine that generates the sequence of actions. In some implementations, the device receives a user input that indicates a sequence of actions. For example, the set of actions includes movement trajectory, operation of weapons or other related equipment, dialogue, etc. for the OEs. For example, with reference to FIG. 8C, the scraper engine 820 extracts a set of actions performed by the OEs during the event.

As represented by block 11-3, the method 1100 includes synthesizing an initial set of objectives for the first OE based on the set of actions extracted from source assets associated with an event. For example, with reference to FIG. 8C, the objective generator 830 synthesizes an initial set of objectives based on the extracted set of actions. In some implementations, the initial set of objectives is consistent with the set of actions. For example, if the predefined set of actions does not include killing, then the objective cannot be to kill. For example, if the set of actions includes at least start and end points (e.g., book-ends) for the event, the objective is derived to get a character from the start to the end point. For example, characters cannot perform actions "outside" of intellectual property (IP) or digital rights management (DRM)-limited bounds.

In some implementations, synthesizing the initial set of objectives includes utilizing a neural network. For example, a neural network generates the initial set of objectives based on a set of neural network parameters (e.g., weights). For example, the neural network parameters are determined by a reward function.

In some implementations, the initial set of objectives is provided to a training module that adjusts parameters of a neural network that generates the objective. For example, the training module includes a reward function that assigns positive rewards to desirable actions and negative rewards to undesirable actions. For example, the training module utilizes reinforcement learning to configure the neural network. For example, the training module utilizes fan-created content (e.g., blog posts), canon video, novels, books, comics and/or video games to train the neural network.

As represented by block 11-4, the method 1100 includes instantiating (e.g., at time $T_0$) the first OE into an SR setting (e.g., an SR setting), wherein the first OE encapsulation is characterized by the initial set of objectives (e.g., synthesized from the source assets) and a set of visual rendering attributes. As such, with reference to FIG. 8C, at time $T_0$, the OE engines 860 within the emergent content architecture 875 are initialized with initial objectives derived from source assets 805.

In some implementations, the method 1100 includes setting virtual environmental conditions for the SR setting based on the initial set of objectives. For example, the virtual environment conditions include one or more of terrain conditions, weather conditions, lighting conditions, environment sounds, and/or the like.

In some implementations, the method 1100 includes obtaining contextual information characterizing the SR setting. For example, the contextual information includes all OEs instantiated within the SR setting. For example, the contextual information includes user-specified scene/environment info. For example, the contextual information includes instantiated characters and equipment assets. For example, the contextual information includes identities of other characters that are to be instantiated. For example, the contextual information includes mesh maps for objects present in the user's environment (e.g., a desk).

As represented by block 11-5, the method 1100 includes generating updated objectives for the first OE based on a function of the initial set of objectives, contextual information associated with the event, and the set of actions. In some implementations, generating the updated set of objectives includes utilizing a neural network. For example, parameters of the neural network are provided by a reward function. For example, with reference to FIG. 8C, the emergent content engine 250 generates an updated set of objectives based at least in part on the previous actions performed by the OE engine 860.

As represented by block 11-6, the method 1100 includes modifying the first OE based on the updated set of objectives (e.g., at time $T_1$). For example, with reference to FIG. 8C, at time $T_1$ and on, the OE engines 860 within the emergent content architecture 875 operate with updated objectives from the emergent content engine 250. In some implementations, the modified objective is provided to a character engine that generated the OE representation, and ultimately to a rendering and display pipeline in order to output SR content showing the OE performing the sequence of actions within the SR setting, and potentially in combination with one or more other OEs. For example, the OE performs actions that achieve the objective or improve the likelihood of achieving the objective.

Figure 12:
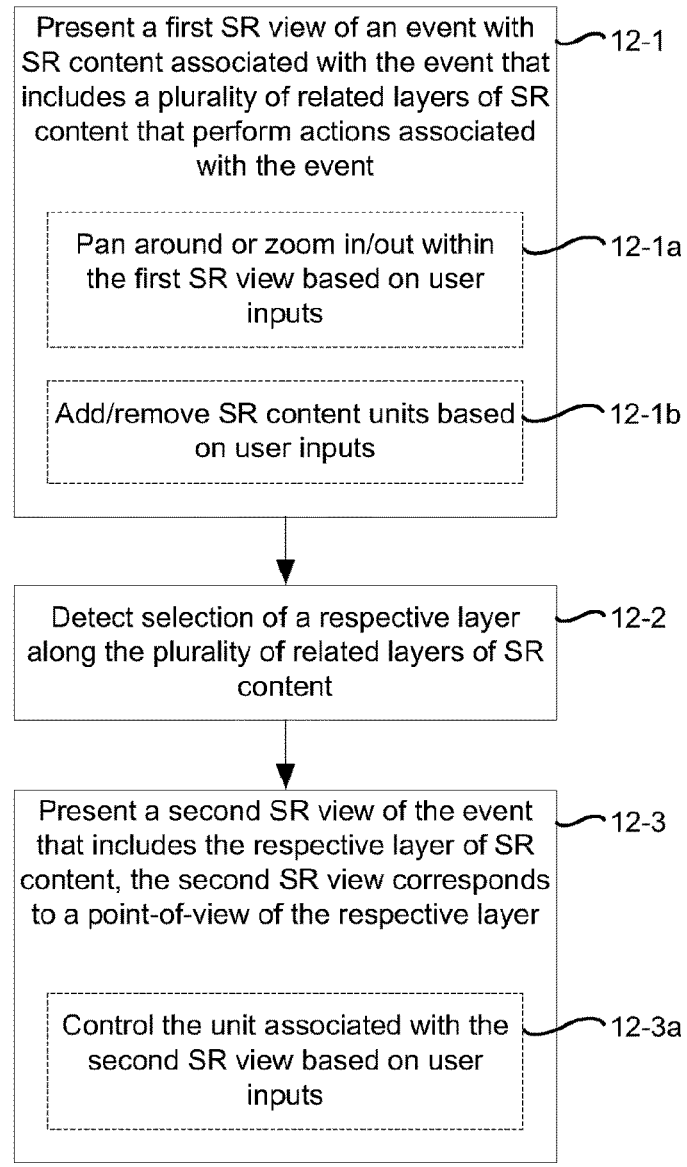
FIG. 12 is a flowchart representation of a method of selecting a point-of-view within an SR setting (e.g., a conditionally dependent SR content threads environment) in accordance with some implementations.

FIG. 12 is a flowchart representation of a method 1200 of selecting a point-of-view within an SR setting (e.g., a conditionally dependent SR content threads environment) in accordance with some implementations. In various implementations, the method 1200 is performed by a device with a non-transitory memory and one or more processors coupled with the non-transitory memory (e.g., the controller 102, the electronic device 103 shown in FIG. 1A, and/or the HMD 104 shown in FIG. 1B). In some implementations, the method 1200 is performed by processing logic, including hardware, firmware, software, or a combination thereof. In some implementations, the method 1200 is performed by a processor executing code stored in a non-transitory computer-readable medium (e.g., a memory).

The method 1200, for example, enables a user to select between different points of view within the multi-level conditionally dependent SR content threads such as an omniscient third-person view of an overall battlefield, a squadron view for a group of planes, a captain view for a destroyer, a first-person view for a specific marine within an amphibious landing craft, or the like.

As represented by block 12-1, the method 1200 includes presenting a first SR view of an event with SR content associated with the event that includes a plurality of inter-related layers of SR content that perform actions associated with an event. For example, the event corresponds to an athletic event, a concert, a battle, or another large-scale occurrence. In some implementations, the SR content is synthesized based on source material/assets associated with the event including, for example, plans for the event such as battle plans, ground truth for the event such as the course and outcomes of the battle, historical accounts or memoirs, screenplays, scripts, text or audio books, movies, video games, novels, etc.

In some implementations, as represented by block 12-1a, the method 1200 includes panning around or zooming in/out within the first SR view based on user inputs. As such, the user is able to view the event from a nearly infinite number of perspectives. In some implementations, as represented by block 12-1b, the method 1200 includes adding and/or removing layers and/or SR content elements based on user inputs. As such, the user is able to play-out various "what if" simulations of the event with modified layers and/or changed numbers of elements.

In some implementations, SR content includes the environmental conditions (e.g., weather) and/or terrain associated with the event based on source assets associated with the event. In some implementations, the method 1200 includes modifying the environmental conditions and/or terrain associated with the event based on user inputs. As such, the user is able to play-out various "what if" simulations of the event with modified environmental conditions (e.g., weather) and/or terrain.

As represented by block 12-2, the method 1200 includes detecting selection of a respective layer among the plurality of inter-related layers of SR content. For example, the selection corresponds to a voice command, a gestural command, selection of an affordance associated with the respective layer, or the like.

As represented by block 12-3, the method 1200 includes presenting a second SR view of the event that includes the respective layer of SR content, where the second SR view corresponds to a point-of-view of the respective layer. According to some implementations, the first SR view corresponds to an omniscient third-person view of the event (e.g., a virtual view of a battlefield commander), and the second SR view corresponds to a first-person view of an individual character within the event (e.g., a soldier on the battlefield or a pilot in an aircraft). As one example, state 725 in FIG. 7B shows a first SR view of the event (e.g., a particular battle from an overall multi-dimensional view), and state 735 in FIG. 7C shows a second SR view of the event e.g., a particular battle from an aerial view).

In some implementations, while presenting the second SR view, the method 1200 includes presenting lower level layers in addition to the respective layer. For example, if the respective layer corresponds to a specific transport ship, also show the amphibious landing craft each including a company of marines riding on the transport ship.

In some implementations, while presenting the second SR view, the method 1200 includes presenting directly related higher level layers in addition to the respective layer. For example, if the respective layer corresponds to a specific marine, also show the balance of his company and the amphibious landing ship on which the specific marine is riding.

In some implementations, while presenting the second SR view, the method 1200 includes excluding presentation of higher-level layers. For example, if the respective layer corresponds to a specific pilot of an aircraft, exclude the other crew on the airplane and the other aircraft in the squadron.

In some implementations, while presenting the second SR view, the method 1200 includes excluding presentation of orthogonal equal level layers. For example, if the respective layer corresponds to a specific marine, also show the balance of his company and the amphibious landing ship on which the specific marine is riding but no other amphibious landing craft from the same transport ship.

In some implementations, as represented by block 12-3a, the method 1200 includes controlling the SR content element associated with the second SR view based on user inputs. In some implementations, at run-time, the layers continue to playout concurrently whether they are currently presented or not.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a computing system including non-transitory memory and one or more processors, wherein the computing system is communicatively coupled to a display device and one or more input devices:
instantiating a first objective-effectuator (OE) associated with a first set of attributes and a second OE associated with a second set of attributes into a synthesized reality (SR) setting, wherein the first set of attributes includes first contextual information associated with a current state of the first OE, and wherein the second set of attributes includes second contextual information associated with a current state of the second OE;
generating a first objective for the first OE based on the first set of attributes for the first OE and the second set of attributes for the second OE, wherein the first objective is consistent with the first and second contextual information;
generating a second objective for the second OE based on the second set of attributes for the second OE, wherein the second objective is different from the first objective, and wherein the first and second objectives are associated with a first time period between a first temporal point and a second temporal point;
generating a first set of actions associated with the first time period for the first OE based on the first objective;
generating a second set of actions associated with the first time period for the second OE based on the second objective; and
rendering for display the SR setting including the first set of actions performed by the first OE and the second set of actions performed by the second OE.

2. The method of claim 1, further comprising:
instantiating a third OE associated with a third set of attributes into the SR setting for a second time period, wherein the first OE is encapsulated within the second and third OEs; and
updating the first objective for first OE for the second time period based on the first and second sets of attributes and also the third set of attributes associated with the third OE.

3. The method of claim 1, further comprising:
removing the second OE from the SR setting for a second time period; and
updating the first objective for first OE for the second time period based on the first set of attributes.

4. The method of claim 1, further comprising:
instantiating a third OE associated with a third set of attributes and a fourth OE associated with a fourth set of attributes into the SR setting, wherein the third OE is encapsulated within the fourth OE.

5. The method of claim 4, wherein the first and second OEs are associated with a first OE grouping, and wherein the third and fourth OEs are associated with a second OE grouping.

6. The method of claim 5, wherein at least one OE is included in both the first and second OE groupings.

7. The method of claim 1, wherein generating the second set of actions includes generating the second set of actions associated with the first time period for the second OE based on a self-preservation objective instead of the second objective if a predetermined criterion is satisfied.

8. The method of claim 1, further comprising:
obtaining contextual information characterizing the SR setting, wherein the contextual information includes information associated with OEs instantiated within the SR setting.

9. The method of claim 8, wherein the contextual information includes information associated with user-specified information associated with the SR setting.

10. The method of claim 1, further comprising:
setting virtual environmental conditions for the SR setting, wherein the virtual environmental conditions are set based on source assets characterizing a scene.

11. The method of claim 10, further comprising:
receiving a user input modifying the virtual environmental conditions for the SR setting for a second time period; and
in response to receiving the user input, modifying the virtual environmental conditions for the SR setting based on the user input for the second time period.

12. A computing system comprising:
one or more processors;
a non-transitory memory;
an interface for communicating with a display device and one or more input devices; and one or more programs stored in the non-transitory memory, which, when executed by the one or more processors, cause the computing system to:
  instantiate a first objective-effectuator (OE) associated with a first set of attributes and a second OE associated with a second set of attributes into a synthesized reality (SR) setting, wherein the first set of attributes includes first contextual information associated with a current state of the first OE, and wherein the second set of attributes includes second contextual information associated with a current state of the second OE;
  generate a first objective for the first OE based on the first set of attributes for the first OE and the second set of attributes for the second OE, wherein the first objective is consistent with the first and second contextual information;
  generate a second objective for the second OE based on the second set of attributes for the second OE, wherein the second objective is different from the first objective, and wherein the first and second objectives are associated with a first time period between a first temporal point and a second temporal point;
  generate a first set of actions associated with the first time period for the first OE based on the first objective;
  generate second set of actions associated with the first time period for the second OE based on the second objective; and
  render for display the SR setting including the first set of actions performed by the first OE and the second set of actions performed by the second OE.

13. The computing system of claim 12, wherein the one or more programs further cause the computing system to:
  instantiate a third OE associated with a third set of attributes into the SR setting for a second time period, wherein the first OE is encapsulated within the second and third OEs; and
  update the first objective for first OE for the second time period based on the first and second sets of attributes and also the third set of attributes associated with the third OE.

14. The computing system of claim 12, wherein the one or more programs further cause the computing system to:
  remove the second OE from the SR setting for a second time period; and
  update the first objective for first OE for the second time period based on the first set of attributes.

15. The computing system of claim 12, wherein the one or more programs further cause the computing system to:
  instantiate a third OE associated with a third set of attributes and a fourth OE associated with a fourth set of attributes into the SR setting, wherein the third OE is encapsulated within the fourth OE.

16. The computing system of claim 15, wherein the first and second OEs are associated with a first OE grouping, and wherein the third and fourth OEs are associated with a second OE grouping.

17. The computing system of claim 16, wherein at least one OE is included in both the first and second OE groupings.

18. A non-transitory memory storing one or more programs, which, when executed by one or more processors of a computing system with an interface for communicating with a display device and one or more input devices, cause the computing system to:
  instantiate a first objective-effectuator (OE) associated with a first set of attributes and a second OE associated with a second set of attributes into a synthesized reality (SR) setting, wherein the first set of attributes includes first contextual information associated with a current state of the first OE, and wherein the second set of attributes includes second contextual information associated with a current state of the second OE;
  generate a first objective for the first OE based on the first set of attributes for the first OE and the second set of attributes for the second OE, wherein the first objective is consistent with the first and second contextual information;
  generate a second objective for the second OE based on the second set of attributes for the second OE, wherein the second objective is different from the first objective, and wherein the first and second objectives are associated with a first time period between a first temporal point and a second temporal point;
  generate a first set of actions associated with the first time period for the first OE based on the first objective;
  generate second set of actions associated with the first time period for the second OE based on the second objective; and
  render for display the SR setting including the first set of actions performed by the first OE and the second set of actions performed by the second OE.

19. The non-transitory memory of claim 18, wherein the one or more programs further cause the computing system to:
  instantiate a third OE associated with a third set of attributes into the SR setting for a second time period, wherein the first OE is encapsulated within the second and third OEs; and
  update the first objective for first OE for the second time period based on the first and second sets of attributes and also the third set of attributes associated with the third OE.

20. The non-transitory memory of claim 18, wherein the one or more programs further cause the computing system to:
  remove the second OE from the SR setting for a second time period; and
  update the first objective for first OE for the second time period based on the first set of attributes.

21. The non-transitory memory of claim 18, wherein the one or more programs further cause the computing system to:
  instantiate a third OE associated with a third set of attributes and a fourth OE associated with a fourth set of attributes into the SR setting, wherein the third OE is encapsulated within the fourth OE.

22. The non-transitory memory of claim 21, wherein the first and second OEs are associated with a first OE grouping, and wherein the third and fourth OEs are associated with a second OE grouping.

23. The non-transitory memory of claim 22, wherein at least one OE is included in both the first and second OE groupings.

* * * * *